US006386445B2

(12) United States Patent
Imai et al.

(10) Patent No.: US 6,386,445 B2
(45) Date of Patent: May 14, 2002

(54) MEDIUM ISSUING APPARATUS USING PAPER ROLL MEDIUM AND AUTOMATIC TELLER MACHINE USING THE APPARATUS

(75) Inventors: Masayuki Imai; Kazuto Kitano; Mitsushige Nakao, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/774,079

(22) Filed: Jan. 31, 2001

(30) Foreign Application Priority Data

Mar. 14, 2000 (JP) ....................................... 2000-071153

(51) Int. Cl.[7] ................................................ G06F 17/60
(52) U.S. Cl. ........................ 235/379; 235/445; 235/475
(58) Field of Search ................................ 235/379, 380, 235/381, 385; 902/17, 18; 705/17, 41

(56) References Cited

U.S. PATENT DOCUMENTS 5,597,996 A * 1/1997 Flood ......................... 235/379
5,719,383 A * 2/1998 Forrest ....................... 235/379
5,850,075 A * 12/1998 Brannan et al. ............ 235/379
5,898,155 A 4/1999 Imai et al. .................. 235/379
5,929,412 A * 7/1999 Nakatani .................. 235/89 R
6,073,837 A * 6/2000 Milne ......................... 235/379

FOREIGN PATENT DOCUMENTS

JP 8-153143 6/1996

* cited by examiner

*Primary Examiner*—Karl D. Frech
*Assistant Examiner*—Ahshik Kim
(74) *Attorney, Agent, or Firm*—Staas & Halsey LLP

(57) ABSTRACT

A medium issuing apparatus using at least a paper roll medium and an automatic teller machine including the apparatus are disclosed, in which the operation of changing the width of the paper rolls for issuing a medium, the maximum diameter of the paper rolls, the printing surface and the tandem arrangement or juxtaposition of the paper rolls is performed with a single apparatus. The medium issuing apparatus is so configured that the paper rolls are held on a replaceable holding frame, the roll paper from the desired paper roll is transported and printed in a common printing mechanism. The printed roll paper is cut off and a predetermined number of cut pieces are stored and bundled in a temporary storage section. The roll paper cut off and bundled are transported to a common ejection opening by a transport mechanism, and ejected from the same common ejection opening by another transport mechanism. The outer diameter, width and winding direction of the paper rolls can be changed by the holding frame.

33 Claims, 22 Drawing Sheets

MEDIUM ISSUING APPARATUS USING PAPER ROLL MEDIUM AND AUTOMATIC TELLER MACHINE USING THE APPARATUS

BACKGROUND OF THE INVENTION

1. Field of the Invention

The present invention relates to a medium issuing apparatus using a paper roll medium and an automatic teller machine using the apparatus or, in particular, to a medium issuing apparatus for issuing a medium such as a ticket or a receipt and an automatic teller machine, installed in a financial institution or the like outlet with a medium issuing apparatus, into which the customer inserts a card or the like to conduct transactions such as deposit and withdrawal.

2. Description of the Related Art

Generally, an automatic teller machine, installed in a financial institution or the like outlet, issues a receipt printed with the specifics of the transaction conducted by the customer. As part of the services offered to the customer, on the other hand, there is a demand for a medium issuing apparatus using a paper roll medium, and an automatic transaction machine using the apparatus, which can readily output and present, together with the receipt, a multiplicity of supplementary information including the transaction history of the customer, information on the services offered by the financial institution, information from the internet, etc.

The medium issuing apparatus using the paper roll medium for application to the automatic teller machine described in Japanese Unexamined Patent Publication (Kokai) No. 8-153143 filed by the present applicant is configured to hold a plurality of paper rolls and comprises two paper roll holding sections with paper rolls set therein. In this medium issuing apparatus, the paper rolls are fed and rewound by paper roll drive mechanisms. The fed paper rolls are printed in a common printing mechanism and the paper rolls thus printed are cut off in a common cutting mechanism. The roll paper thus cut off (a cut piece) is transported by a common transport mechanism and ejected from a single common ejection opening 8.

The technology incorporated in this medium issuing apparatus for supplying the supplementary information to the customer is such that when a plurality of paper rolls or normally two paper rolls of the same width are set, one of the paper rolls is used to issue a receipt while the supplementary information is printed on the other paper roll in a common printing mechanism 4.

The method employed in the conventional medium issuing apparatus cannot use paper rolls, making up the medium, having different widths but uses a plurality of paper rolls having a single width, and thus fails to meet the requirement of individual customers such as banks desiring to issue a plurality of types of media having different widths.

Especially, the printing area of the conventional medium for receipts has a width of only about 15 cm which is insufficient to hold the supplementary information containing a great amount of data. In other words, the medium having the width of an A4 or letter size sheet, which can accommodate a greater number of printing lines, cannot be used. Further, a single sheet of paper is not sufficient to issue a great amount of information at a time. The method in which a sheet of the roll paper having a single width is issued a plurality of times is both complex and low in processing speed and imposes a considerable burden on the customer.

The fact that the shape of the paper roll holding unit is fixed, on the other hand, makes it difficult to freely design the medium issuing apparatus for other applications. Another factor forming a stumbling block to different applications of this apparatus is the arrangement of switches and a manual operating mechanism for maintenance of the printing mechanism (refilling the medium, removing a jam, etc.) on one side of the medium issuing apparatus.

SUMMARY OF THE INVENTION

Accordingly, the object of the present invention is to provide a medium issuing apparatus, and an automatic teller machine using the apparatus, in which the operation of appropriately changing the width and the maximum diameter, the printing surface, etc. of the paper roll for issuing a medium, and changing the tandem arrangement or juxtaposition of the paper rolls can be performed with a single apparatus to meet the various customer requirements.

In order to achieve the object described above, according to one aspect of this invention, there is provided a medium issuing apparatus, using a paper roll medium, comprising a paper roll holding section for holding a plurality of paper rolls, a plurality of paper roll drive mechanisms for feeding out or rewinding the paper rolls, respectively, a common printing mechanism for printing the roll paper fed out from each paper roll drive mechanism, a common cutting mechanism for cutting off each roll paper to a predetermined length, a first common transport mechanism for transporting pieces of the roll paper cut by the common cutting mechanism, a temporary storage section for storing a plurality of cut pieces transported by the first common transport mechanism and capable of compressing the cut pieces into a bundle, a second common transport mechanism for transporting a plurality of cut pieces, in a bundle accumulated in the temporary storage section, a common ejection opening for ejecting a plurality of cut pieces in a bundle transported by the second common transport mechanism, a common receiving section for receiving a plurality of the cut pieces in a bundle remaining at the common ejection opening and a control unit for controlling the whole operation of the apparatus.

The holding member for holding the paper rolls in the paper roll holding section can be replaced on the apparatus as required, so that a plurality of the paper rolls may be arranged in tandem, or the juxtaposition with respect to the apparatus, or the width of a plurality of the paper rolls may be changed. Also, a plurality of paper roll drive mechanisms each may include a paper roll insertion guide member having a curved slope in an opposed relation to the base surface to widen the angle for receiving the paper rolls arriving from many directions. Further, in the case where a plurality of paper rolls are arranged in juxtaposition, the reference printing position of the common printing mechanism can be reversed laterally in accordance with the width of the paper rolls.

In a pair of upper and lower medium transport rollers arranged in the medium transport mechanism of the common receiving section, a circumferential groove having a trapezoidal section may be formed at a predetermined position of at least one of the medium transport rollers, and a flange having a wedge-shaped section with the forward end thereof adapted to enter the circumferential groove may be formed on the other medium transport roller at a position opposed to the circumferential groove. Then, a rib-shaped portion for preventing the medium from curling can be formed in the medium after it has passed through the transport rollers.

According to another aspect of the invention, in order to achieve the object described above, there is provided an automatic teller machine, using the medium issuing apparatus and operable by the customers, comprising a control unit connected on-line to a host computer, a customer operating section, a card operating section, a cash processing section, a deposit processing section, a medium issuing section and a host line processing section, wherein the medium issuing section includes a medium issuing apparatus described in any one of claims 1 to 5.

According to still another aspect of the invention, there are provided a medium issuing apparatus, using a paper roll medium, and an automatic teller machine using the apparatus, wherein the roll holding member built into the printing unit body and meeting various requirements is replaceable, and an insertion guide member having a curved guide wall is introduced to allow the insertion of the paper roll over a wider angle. Thus, it is possible to change the position of the paper roll, the maximum outer winding diameter of the paper roll, the tandem arrangement or juxtaposition of the paper rolls, the width of the paper roll and the winding direction of the paper roll (upward or downward). In this way, many variations can be provided in accordance with the customer requirements.

In addition, the use of the temporary storage section makes it possible to release a plurality of sheets of paper in bundle at a time.

Further, the freedom of design of the shape of the housing permits the maintenance work to be carried out from both sides of the apparatus, thus facilitating free design for different applications.

BRIEF DESCRIPTION OF THE DRAWINGS

The present invention will be more clearly understood from the description as set forth below with reference to the accompanying drawings, wherein:

FIGS. 3A to 3C show examples of the operation for replacing the paper roll holding member, in which FIG. 3A is a diagram showing an embodiment with a small winding outer diameter of the rolls, FIG. 3B is a diagram showing an embodiment with the roll winding outer diameter considerably differentiated in accordance with whether the paper roll is used frequently or not, and FIG. 3C is a diagram showing an embodiment with the roll wound in the opposite direction;

FIGS. 4A and 4B show a three-dimensional arrangement of a plurality of paper rolls, in which FIG. 4A is a perspective view showing an embodiment with the paper rolls arranged in tandem, and FIG. 4B is a perspective view showing an embodiment with the paper rolls arranged in juxtaposition;

FIGS. 9A and 9B are diagrams for explaining a paper roll arrangement and the printing reference for the paper roll, in which FIG. 9A is a perspective view showing the printing reference and the printing area for each paper roll with the paper rolls arranged in tandem, and FIG. 9B is a perspective view showing the printing reference and the printing area for each of the paper rolls arranged in juxtaposition;

FIGS. 16A and 16B show the operation of the temporary storage section, in which FIG. 16A is a diagram showing the manner in which cut roll paper are stored in the temporary storage section, and FIG. 16B is a diagram showing the manner in which the medium stored in the temporary storage section is sent in a bundle to the ejection side;

DESCRIPTION OF THE PREFERRED EMBODIMENTS

Before describing the preferred embodiments, an explanation will be given of the conventional medium issuing apparatus using a paper roll medium and the conventional automatic teller machine using the apparatus of FIG. 1.

Figure 1:
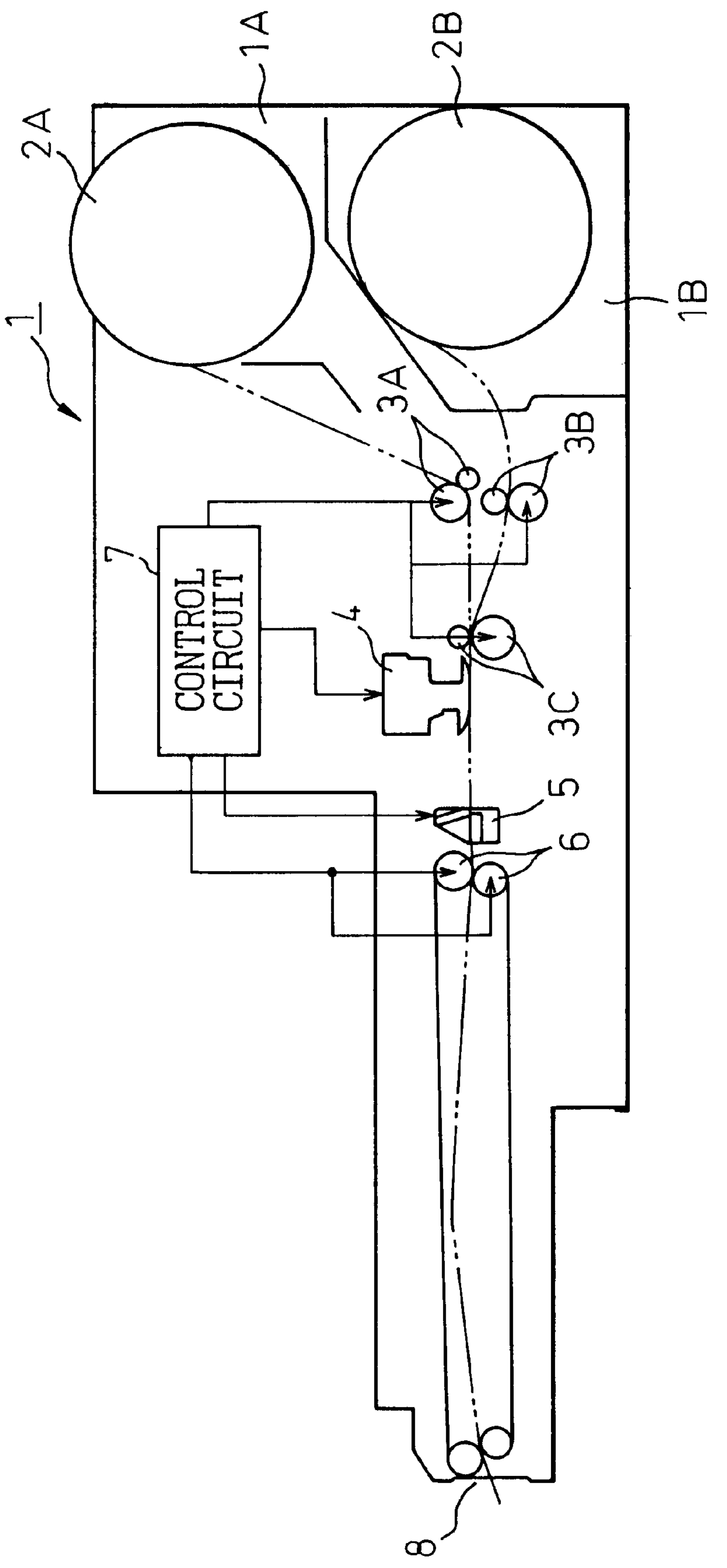
FIG. 1 is a diagram showing a configuration of a conventional medium issuing apparatus.

FIG. 1 shows a general configuration of a medium issuing apparatus 1 using a paper roll medium for an automatic teller machine described in Kokai No. 8-152143 filed by the present applicant. The apparatus 1 is configured to hold a plurality of paper rolls. A paper roll 2A is set in a paper roll holding section 1A and a paper roll 2B is set in a paper roll holding section 1B of the apparatus 1. Reference numerals 3A, 3B, and 3C designate paper roll drive mechanisms each operating to feed out or rewind the paper roll. Specifically, the drive mechanism 3A feeds out and rewinds the paper roll 2A, and the drive mechanism 3B feeds out and rewinds the paper roll 2B. The drive mechanism 3C, which is located at a point where the paper rolls 2A and 2B merge, feeds out and rewinds both the paper rolls 2A and 2B. Numeral 4 designates a common printing mechanism for printing the paper roll fed out by each of the paper roll drive mechanisms. The paper roll thus printed is cut off by a common cutting mechanism 5, and the cut paper roll (cut piece) is transported by a common transport mechanism 6 and ejected from a single common ejection opening 8. Numeral 7 designates a control circuit for controlling the drive of the whole apparatus 1.

In this medium issuing apparatus 1, a plurality of paper rolls or, normally, the two paper rolls 2A and 2B of the same width, are set for providing supplementary information to the customers. One of the paper rolls 2A and 2B is used for receipts, and the other medium is printed with the supplementary information in the common printing mechanism 4.

The conventional medium issuing apparatus, however, cannot use different widths of paper rolls, making up media, and uses a plurality of paper rolls having a single width as described above. The problem, therefore, is that it is impossible to meet the desire of individual bank customers to acquire many types of media of different widths.

Especially in the case where supplementary information containing a great amount of data is output, the printing area of the conventional medium for receipts having a width of about 15 cm is insufficient to meet such a customer desire. Specifically, a medium having a width of A4 or letter size, which can contain more printing lines, cannot be used. Further, a piece of paper is not sufficient to supply a great amount of information at a time. The repeated issue using the paper rolls of the same width and the resulting complexity and low processing speed poses a considerable burden on customers.

On the other hand, in view of the fact that shape of the housing for holding the paper rolls is fixed, the medium issuing apparatus cannot be easily and freely designed for other applications. Another factor limiting the freedom of design for other applications is that switches and a manual operating mechanism are arranged on one side of the medium issuing apparatus to perform the maintenance operation (refilling of the medium and removal of a jam).

The present invention obviates these problems. First, the configuration of a medium issuing apparatus using paper rolls according to this invention will be explained, and then the configuration of an automatic teller machine using the medium issuing apparatus will be described.

Figure 2:
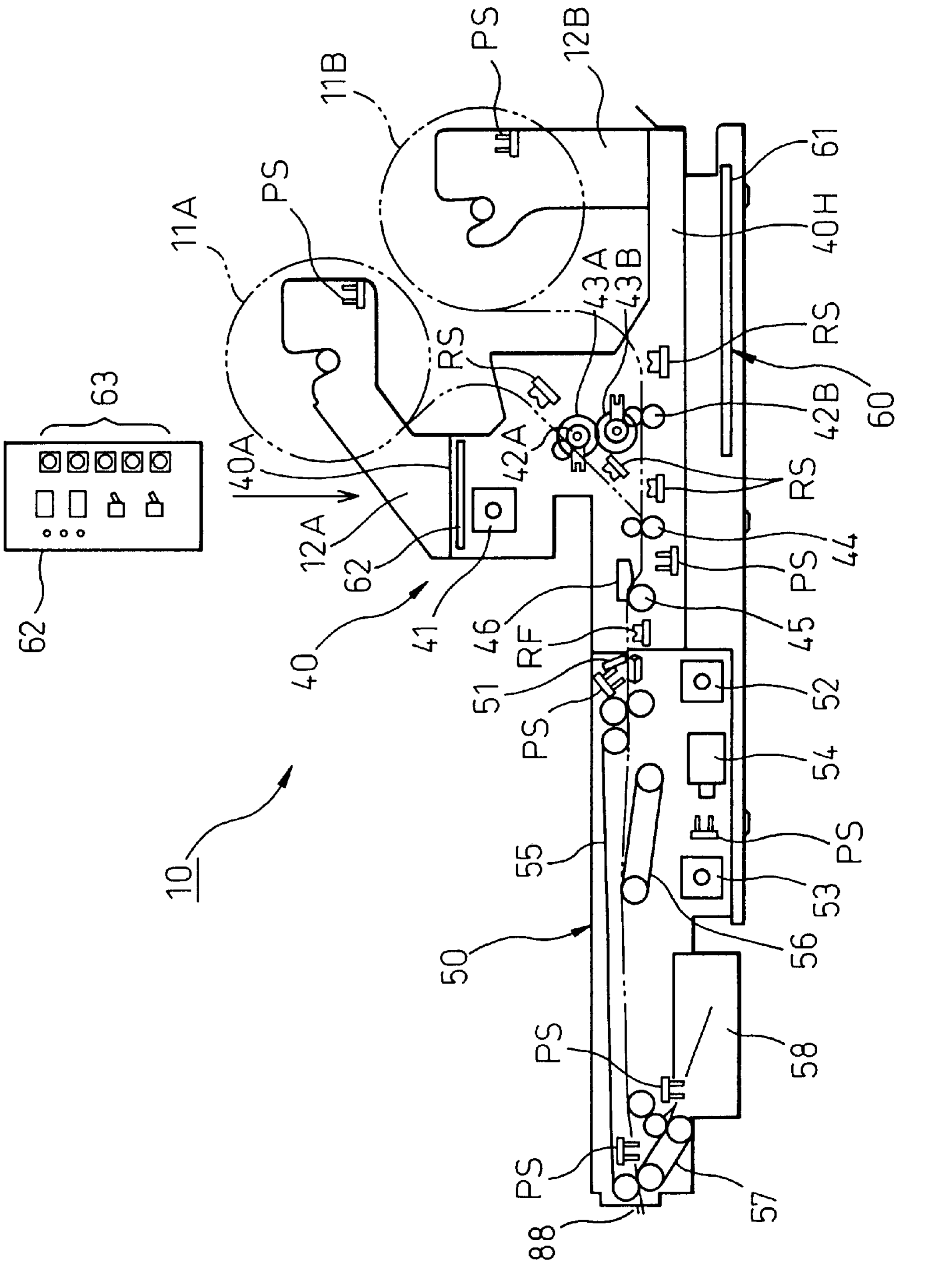
FIG. 2 is a diagram showing a general configuration of a medium issuing apparatus using a paper roll medium according to an embodiment of the invention.

FIG. 2 is a diagram showing a general configuration of a medium issuing apparatus 10 using paper rolls 11A and 11B according to an embodiment of the invention. The medium issuing apparatus 10 according to this embodiment comprises a printer unit 40, a feeder unit 50 and a controller 60.

The printer unit 40 includes a paper roll drive motor 41, rollers 42A and 42B driven by a motor 41 to move each of the paper rolls 11A and 11B, electromagnetic clutches 43A and 43B for switching the rotation and stop of the rollers 42A and 42B, a main roller 44 arranged downstream of the merging point of the paper rolls 11A and 11B, a platen 45 and a printing head 46. The paper roll 11A and the paper roll 11B are mounted on a housing 40H of the printer unit 40 through a holding frame 12A and a holding frame 12B, respectively. The holding frame 12A and the holding frame 12B are replaceable on the housing 40H of the printer unit 40 in accordance with the width and diameter of the paper rolls, as described later.

The feeder unit 50 includes a cutter blade 51 for cutting the rolled paper, a cut feed motor 52 for transporting and stopping the paper roll at a cutting position, a receipt delivery motor 53, a solenoid 54, transport belts 55 and 56, a recovery belt 57 and a recovery box 58. The medium M is transported on the transport belts 55 and 56, and ejected from the common ejection opening 88 by the recovery belt 57. Characters PS designate optical sensors, and characters RS reflected light sensors.

The controller 60 includes a control board 61 arranged in the neighborhood of the bottom surface of the printer unit 40, and a switch board 62 manually operable by the customer is arranged in upright position in the neighborhood of the mounting section 40A of the holding frame 12A of the paper roll 11A. A plurality of setting switches 63 are arranged on the switch board 62 so that the operation of the switches may not be limited to the left or right side.

Now, a detailed explanation will be given of the configuration of each part of the medium issuing apparatus 10 described above.

(A) Replacing the paper roll holding frame of a printer unit

As explained with reference to FIG. 2, the holding frame 12A and the holding frame 12B are replaceable on the housing 40H of the printer unit 40 in accordance with the width and diameter of the paper roll. This will be explained with reference to FIGS. 3A to 4B.

Figure 3A:
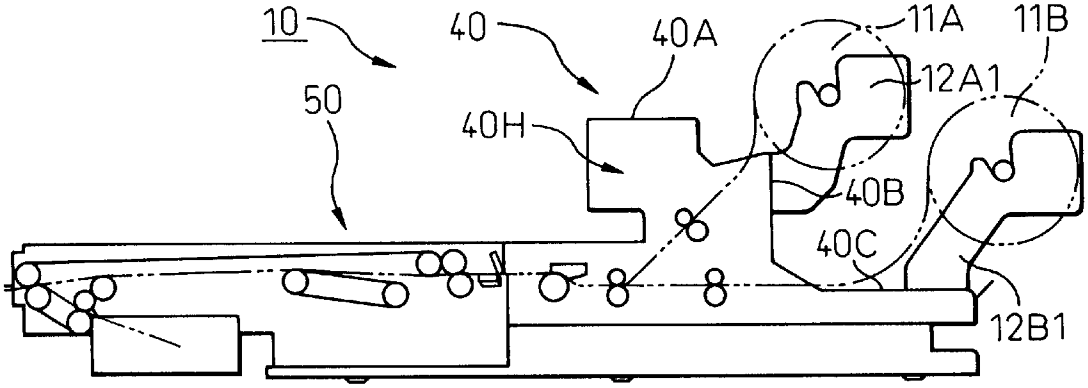
Figure 3B:
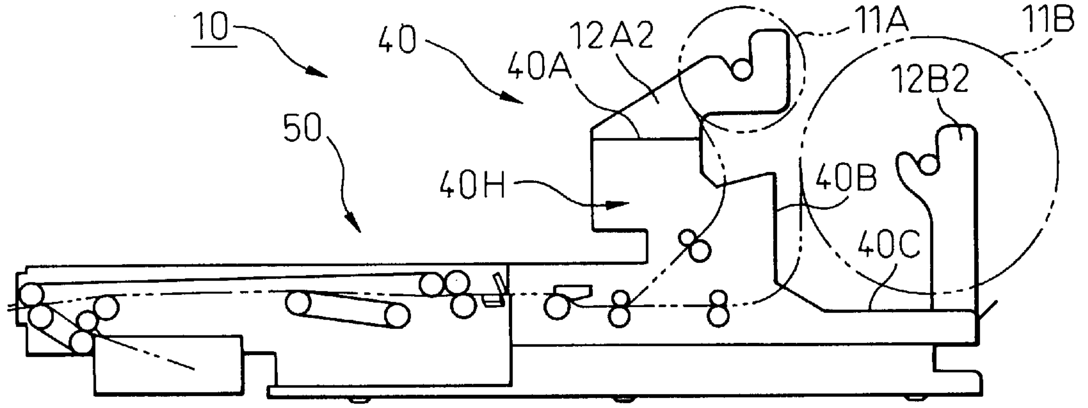
Figure 3C:
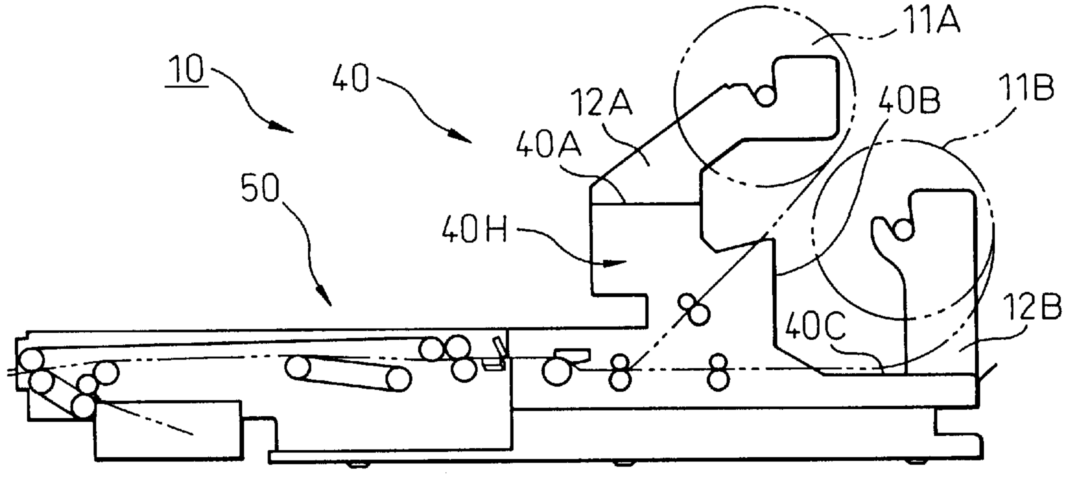

FIGS. 3A to 3C show various examples of positions at which the holding frame 12A and the holding frame 12B for holding the paper rolls 11A and 11B described in FIG. 2 are replaced on the housing H. The housing 4H of the printer unit 40 includes, as shown in FIG. 3A, a first mounting section 40A formed on the upper surface of the housing 40H, a second mounting section 40B formed on the back surface of the first mounting section 40A, and a third flat mounting section 40C adjoining the rear side of the second mounting section 40B. In the embodiment shown in FIG. 2, the L-shaped holding frame 12A is mounted on the first mounting section 40A, and the I-shaped holding frame 12B is mounted on the third mounting section 40C.

Also, in the embodiment shown in FIG. 3A, the L-shaped holding frame 12A1 is mounted on the second mounting section 40B, and the L-shaped holding frame 12B1 is mounted on the third mounting section 40C. According to this embodiment, the paper rolls 11A and 11B having a small winding diameter are mounted on the holding frames 12A1 and 12B1, respectively. This embodiment is so configured that the outer winding diameter of the paper rolls 11A and 11B is reduced to lower the height of the medium issuing apparatus 10.

FIG. 3B shows an embodiment in which the paper rolls 11A and 11B are used with different frequencies, the paper roll 11B being used more frequently. According to this embodiment, the L-shaped holding frame 12A2 is mounted on the first mounting section 40A, and the I-shaped holding frame 12B2 is mounted on the third mounting section 40C. Also, the paper roll 11*a* small in winding diameter is mounted on the holding frame 12A2, and the paper roll 11B large in winding diameter is mounted on the holding frame 12B2. In this embodiment, the frequency with which the paper rolls replaced upon depletion of the medium on the medium issuing apparatus 10 can be reduced.

The configuration of the holding frames 12A and 12B in FIG. 3C is the same as that shown in FIG. 2, except that the paper rolls 11A and 11B are wound in the opposite direction to that of the paper rolls 11A and 11B of FIG. 1. In this embodiment, the reverse side of the rolled paper can also be printed.

Figure 4A:
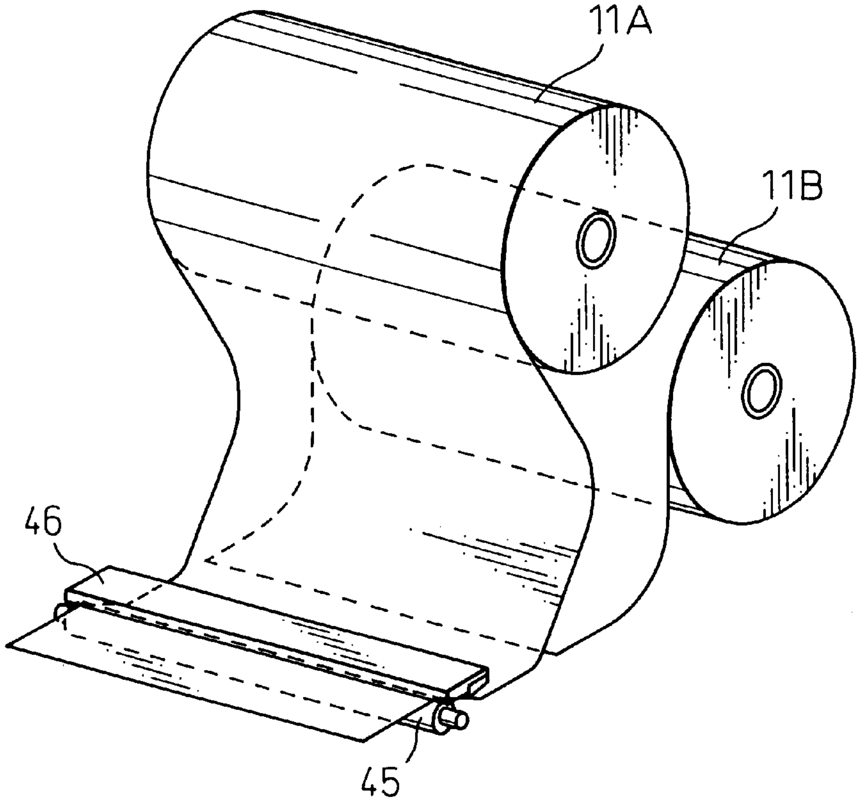
Figure 4B:
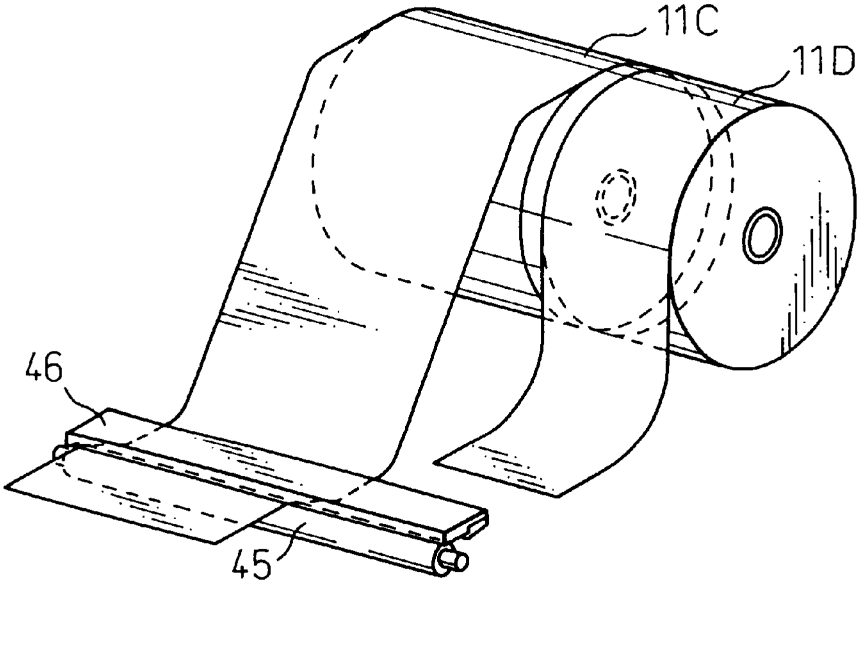

FIGS. 4A and 4B show a three-dimensional state in which the paper rolls 11A and 11B are mounted on the holding frames 12A and 12B (not shown) according to the embodiments shown in FIGS. 3A to 3C. When arranging the paper rolls 11A and 11B as shown in FIG. 3A, for example, it is the common practice to mount one of the paper rolls 11A and 11B of predetermined width on each on the holding frames 12A and 12B. According to this invention, in contrast, two paper rolls 11C and 11D can be mounted in juxtaposition using one holding frame or two as shown in FIG. 4B at the mounting positions of the holding frames 12A and 12B. The two paper rolls 11C and 11D may have the same or different widths. Although FIG. 4B shows the paper rolls 11C and 11D mounted in juxtaposition on one of the holding frames, the paper rolls can be mounted on each of the two holding frames in juxtaposition. Numeral 45 designates a platen, and numeral 46 designates a printing head.

As described above, with the medium issuing apparatus 10 according to the invention, the issuing section proper is formed in small size and the mounting position of the paper roll holding frames can be easily changed in accordance with the application and the holding space of the paper piece supplied from the paper rolls. Also, since a plurality of paper rolls can be mounted in juxtaposition in each of the first to third mounting sections 40A to 40C, a plurality of types of paper rolls can be conveniently used in a limited space. Thus, the medium issuing apparatus according to the invention can meet a multiplicity of customer requirements in versatile way.

(B) Mounting paper rolls of various sizes on holding frames

In the medium issuing apparatus 10 according to the invention, paper rolls of various sizes can be mounted in accordance with the applications, as explained with reference to FIGS. 5 to 7.

Figure 5:
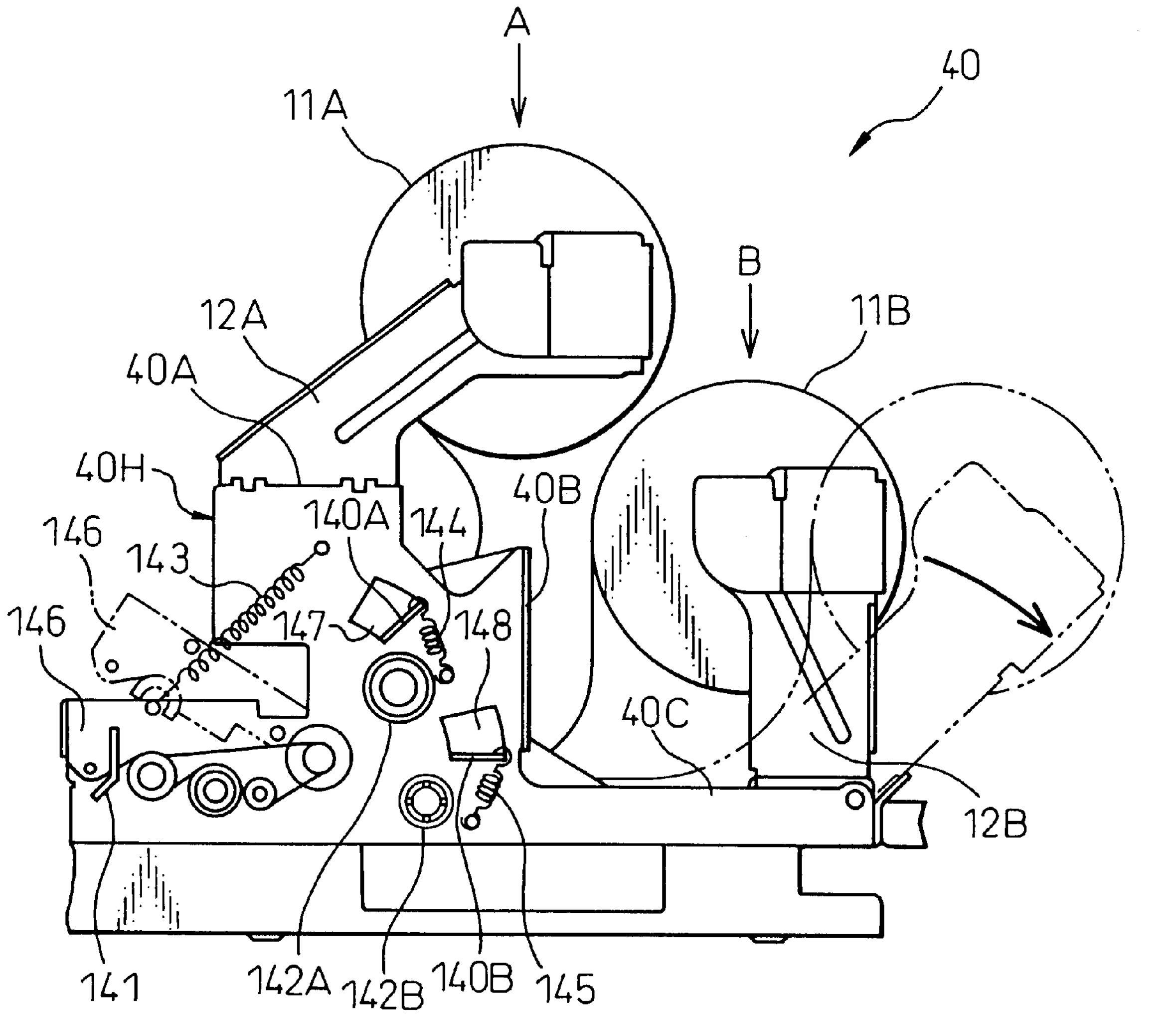
FIG. 5 is a side view showing the printer unit in detail with a plurality of paper rolls arranged in tandem.
Figure 6B:
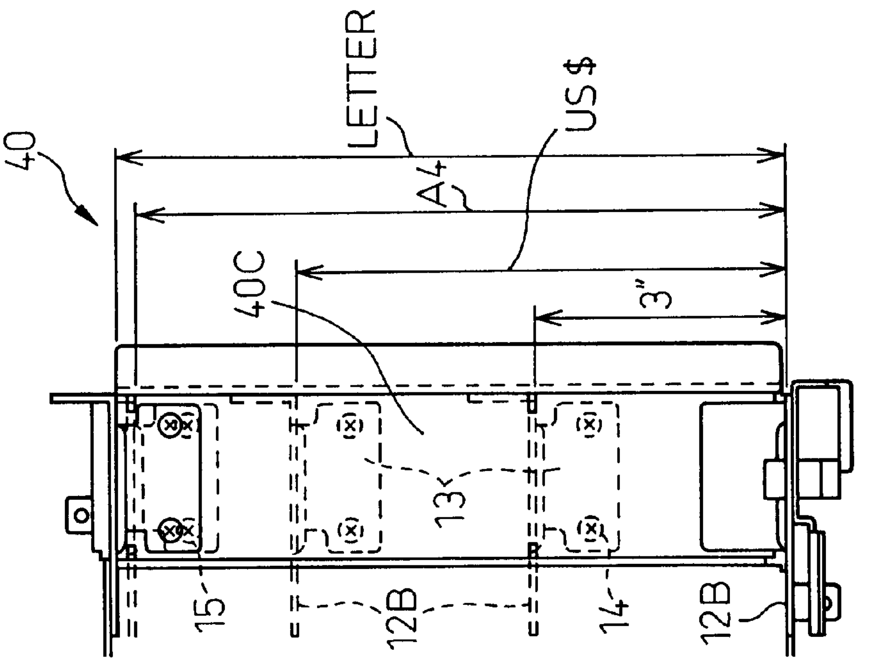
FIG. 6B is a partial plan view of the paper roll holding section of FIG. 5 from the direction of arrow B.
Figure 6A:
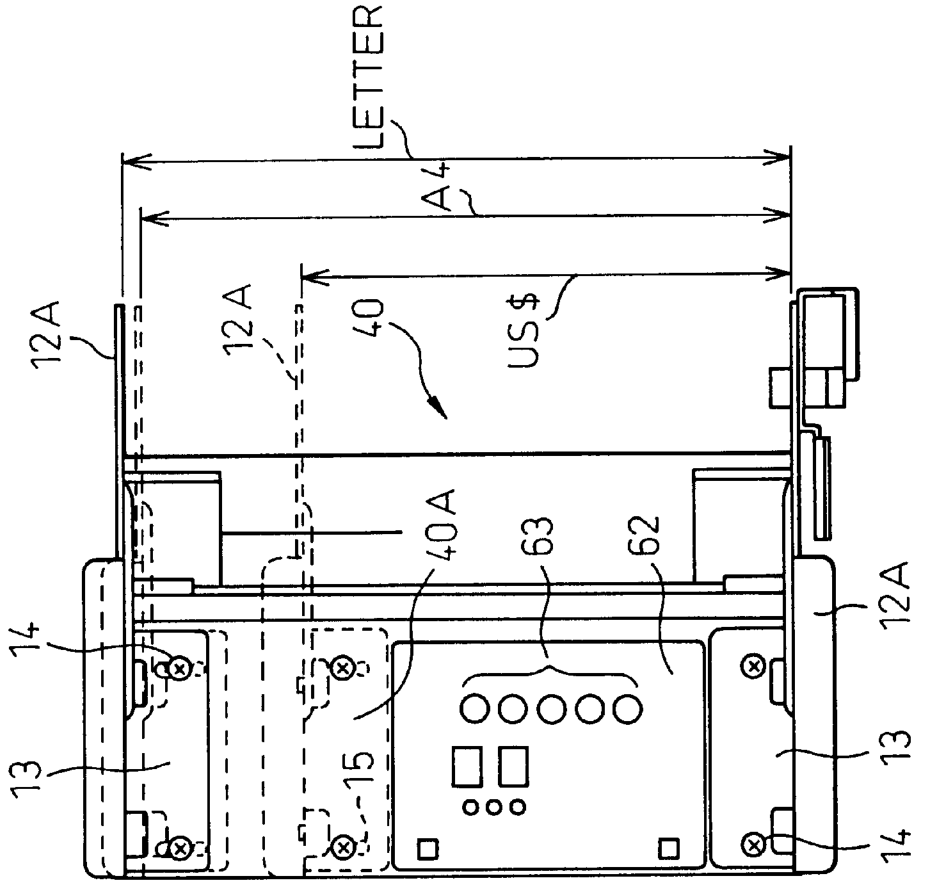
FIG. 6A is a partial plan view of the paper roll holding section of FIG. 5 from the direction of arrow A.

FIGS. 5, 6A, and 6B are detailed side views showing the paper roll holding section with the paper rolls held by the holding frames 12A and 12B in tandem along the length of the printer unit 40. FIG. 5 is a side view showing the essential parts of the printer unit 40, FIG. 6A is a view taken from the direction of arrow A in FIG. 5, and FIG. 6B a view taken in the direction of arrow B in FIG. 5.

In the embodiment shown in FIG. 5, the paper roll 11A is mounted on the first mounting section 40A by the holding frame 12A, and the paper roll 11B is mounted on the third mounting section 40C by the holding frame 12B.

As a protective measure against the jamming of paper which may be caused by the paper rolls 11A and 11B in the housing 40H, a manual operating mechanism is arranged on each of the two sides of the housing 40H having the first to third mounting sections 40A to 40C. The manual operating mechanisms are each configured with knobs 142A and 142B for manually turning the transport rollers arranged in the housing 40H, levers 140A and 140B for pulling up the paper guide plate in the housing 40H, and an open lever 141 for opening the printing head housing to the position indicated by two-dot chain for checking the printing head housing. Numerals 143, 144, and 145 designate springs, and numerals 147 and 148 guide holes through which the levers 140A and 140B are moved.

As shown in FIG. 6A, the holding frame 12A is mounted on the first mounting section 40A by screws 14 through brackets 13 at the base of the holding frame 12A. A switch plate 62 having setting switches 63 at the central portion thereof is mounted on the first mounting section 40A, and a mounting hole 15 for inserting the screws 14 therethrough is arranged on each side of the switch plate 62. In this embodiment, the mounting holes 15 are formed at positions corresponding to the widths of the paper rolls of predetermined sizes held by the holding frame 12A.

As a result, the switch plate 62 can be operated either from the left or right (or upper or lower) side of the medium issuing apparatus. This makes it possible to freely change, in accordance with the customer requirements, the position at which the medium issuing apparatus is built in the automatic teller machine.

The mounting holes 15 include a reference hole arranged on one side of the first mounting section 40A, and a sized hole corresponding to the holding frame 12A which may take various sizes. The holding frame 12A, on the other hand, has a width corresponding to the US dollar (indicated as US$ in the drawing), an A4 size or a letter size sheet. The first mounting section 40A, therefore, is formed with the sized holes 15 corresponding to the holding frame for the US dollars, the sized hole 15 corresponding to the width of the paper roll of letter size and the sized hole 15 corresponding to the width of the paper roll of A4 size. The reference hole is circular, while the sized hole 15 is generally elongated in a way to accommodate the dimensional error of the holding frame 12A. A single elongated sized hole 15 satisfies the requirement of the paper rolls of both A4 size and letter size between which the width difference is small.

FIG. 6B shows the manner in which the holding frame 12B is mounted on the third mounting section 40C according to an embodiment. The holding frame 12B is mounted on the third mounting section 40C through the brackets 13 formed on the base of the holding frame 12B. The holding frame 12B mounted on the third mounting section 40C has a shape corresponding to the width of the paper roll of predetermined size held therein, and secured to the mounting holes 15 of the third mounting section 40C by the screws 14 at the brackets 13.

One of the brackets 13 of the holding frame 12B of each size is always mounted at an end of the printer unit 40, while the other bracket is mounted in the mounting holes 15 of a size corresponding to the holding frame 12B of various sizes arranged on the third mounting section 40C. The holding frame 12B, like the holding frame 12A, is of a type corresponding to the paper roll having the width of the US dollars (described as US$ in the drawing), the paper roll having the width of A4 size, the paper roll having the width of letter size or the paper roll having the width of 3 inches. Thus, the third mounting section 40C has the sized holes 15 corresponding to the various widths of the holding frame 12B.

The holding frame 12B, as shown in FIG. 5, includes a rotation mechanism capable of falling to the position indicated by dashed line. This rotation mechanism is for facilitating the replacement of the paper roll in the holding frame 12A or 12B.

Figure 7A:
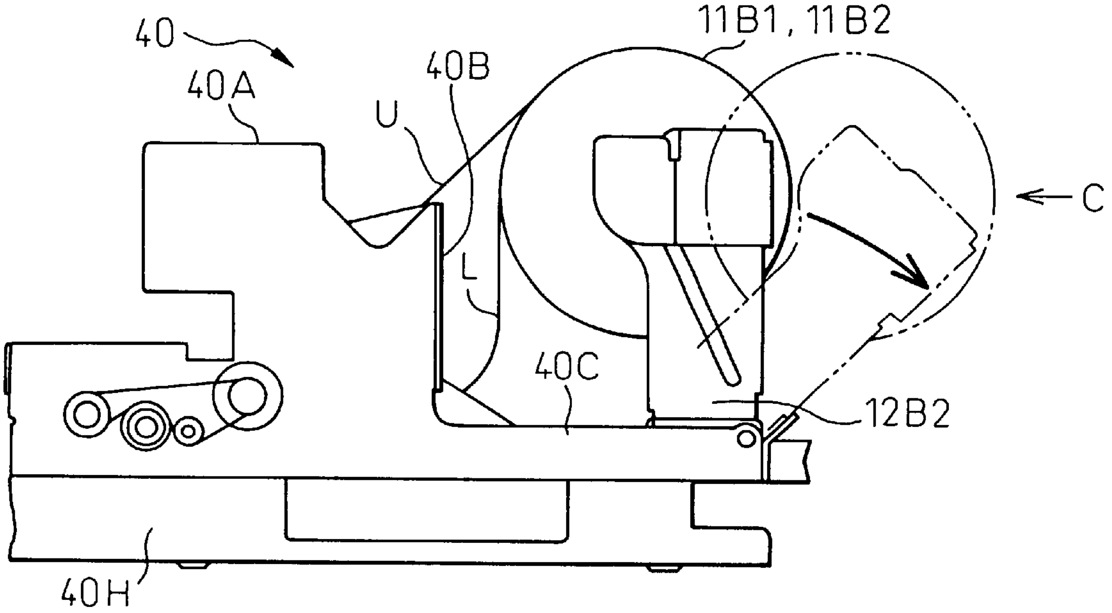
FIG. 7A is a detailed side view showing the paper roll holding section with a plurality of paper rolls arranged in juxtaposition.
Figure 7B:
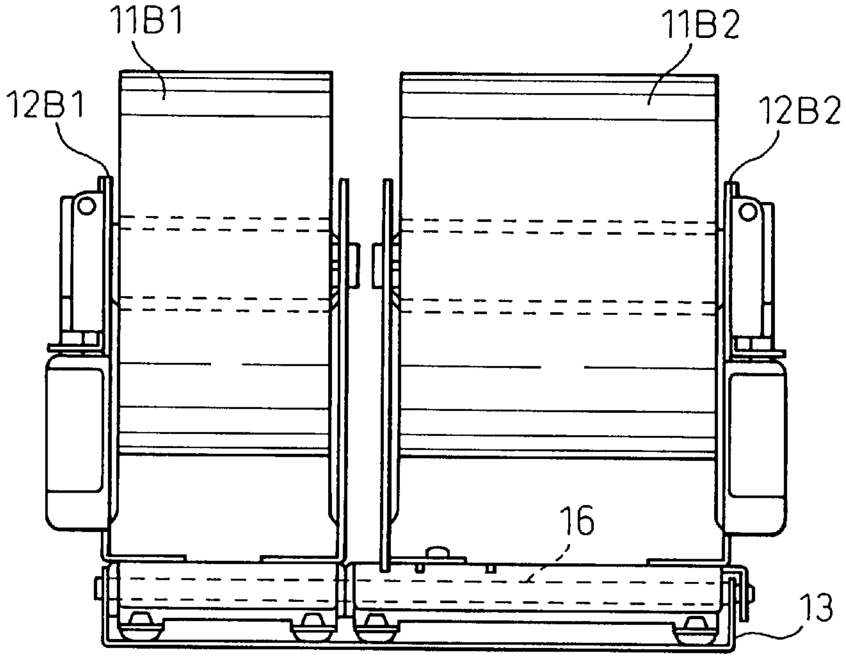
FIG. 7B is a side view of the paper roll holding section of FIG. 7A from the direction of arrow C.

FIGS. 7A and 7B are detailed side views showing the holding section of the paper rolls held by the holding frame in juxtaposition along the length of the printer unit 40. Specifically, FIG. 7A is a side view of the essential parts of the printer unit 40, and FIG. 7B a view in the direction of arrow C in FIG. 7A.

The manual operating mechanism described with reference to FIG. 5 is not shown in FIG. 7A.

According to this embodiment, two holding frames 12B1 and 12B2 are mounted in juxtaposition only on the third mounting section 40C of the housing 40H. A narrow paper roll 11B1 is mounted on the holding frame 12B1 and a wide paper roll 11B2 is mounted on the holding frame 12B2 of the third mounting section 40C.

The holding frames 12B1 and 12B2, as in the embodiment described above, are mounted on the third mounting section 40C by screws through the bracket 13 at the base of the holding frames 12B1 and 12B2, respectively. Also, a rotary shaft 16 making up a rotation mechanism is mounted on the bracket 13 as shown in FIG. 7B, so that the holding frame 12B1 and the holding frame 12B2 can be rotated independently of each other to the position indicated by dashed line in FIG. 7A about the rotary shaft 16. This rotation mechanism is also for facilitating the setting of both the paper rolls 11B1 and 11B2 on the holding frames 12B1 and 12B2, respectively.

According to this embodiment, as shown in FIG. 7A, the path U through which the paper roll 11B1 held by the holding frame 12B1 is transported to the print mechanism is different from the path L through which the paper roll 11B2 held in the holding frame 12B2 is transported to the print mechanism. This is for the purpose of supplying the paper rolls 11A and 11B independently of each other to the printer unit 40. In the case where there are two paper roll transport paths in the printer unit 40, therefore, the holding frame is not mounted on the other mounting sections 40A and 40B.

(C) Configuration of print mechanism and printing reference

Now, the configuration of the printing section of the printer unit 40 and the printing reference will be explained with reference to FIGS. 8 to 9B.

Figure 8:
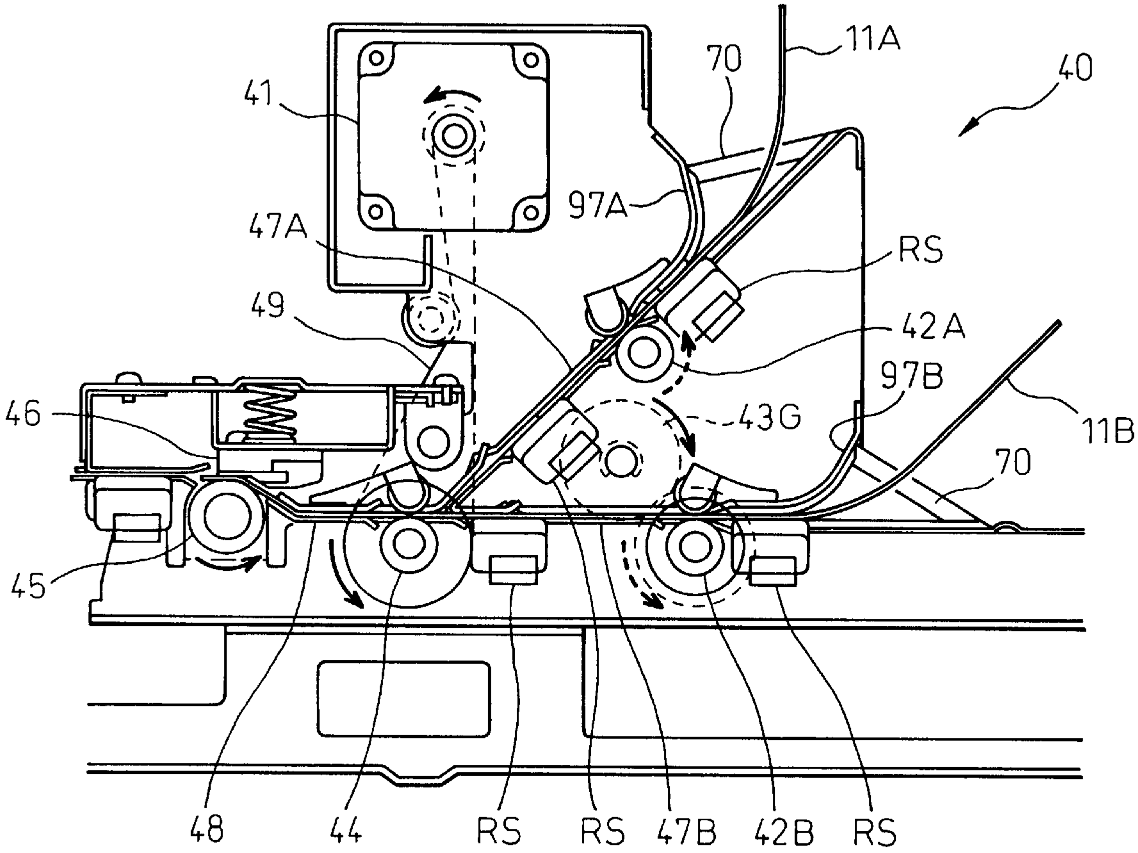
FIG. 8 is a side sectional view showing a detailed configuration of the printer of the printer unit.

As shown in FIG. 8, the printing section of the printer unit 40 includes a paper roll drive motor 41 configured with a stepping motor. With the rotation of the paper roll drive motor 41 in the direction of arrow, the belt 49 moves in the direction of arrow and the main roller 44 rotates. The main roller 44 is arranged in the neighborhood of the merging point 48 of the paper rolls 11A and 11B for transporting the two paper rolls. A first transport path 47A tilted upward and a second transport path 47B extending horizontally are arranged upstream of the main roller 44. The first transport path 47A includes a transport roller 42A, and the second transport path 47B includes a transport roller 42B, each rotated in the direction of the dashed arrow for transporting a medium.

A manual knob 142A described in FIG. 5 is for manually rotating the transport roller 42A arranged on the first transport path 47A. A manual knob 142B, on the other hand, is for manually rotating the transport roller 42B arranged in the second transport path 47B.

The platen 45, arranged in an opposed relation to the printing head 46, is also rotated in the direction of arrow by the belt 49 moved with the rotation of the paper roll drive motor 41. The roller 42A of the first transport path 47A and the roller 42B of the second transport path 47B are selectively rotated by a pulley (not shown) driven by the belt 49, a gear 43G and an electromagnetic clutch (not shown), thereby transporting the medium located on the first transport path 47A or the second transport path 47B, as the case may be.

The members designated by characters RS in the diagram are optical sensors for detecting the presence or absence of a medium, the position of the medium and a black mark for position detection printed on the medium. The functions of these sensors, however, are not directly related to the present invention and therefore will not be described any further.

Further, the sections for receiving the paper rolls 11A and 11B in the first transport path 47A and the second transport path 47B include an insertion guide member 70 and guide plates 97A and 97B for guiding the paper rolls 11A and 11B inserted into the first transport path 47A and the second transport path 47B. The configuration of this insertion guide member 70 will be described later.

The lever 140A described in FIG. 5 is for manually opening the guide plate 97A forming the first transport path 47A. The lever 140B, on the other hand, is for manually opening the guide plate 97B forming the second transport path 4B. These guide plates 97A and 97B are opened by the levers 140A and 140B when a jam occurs on the first transport path 47A or the second transport path 47B.

Figure 9A:
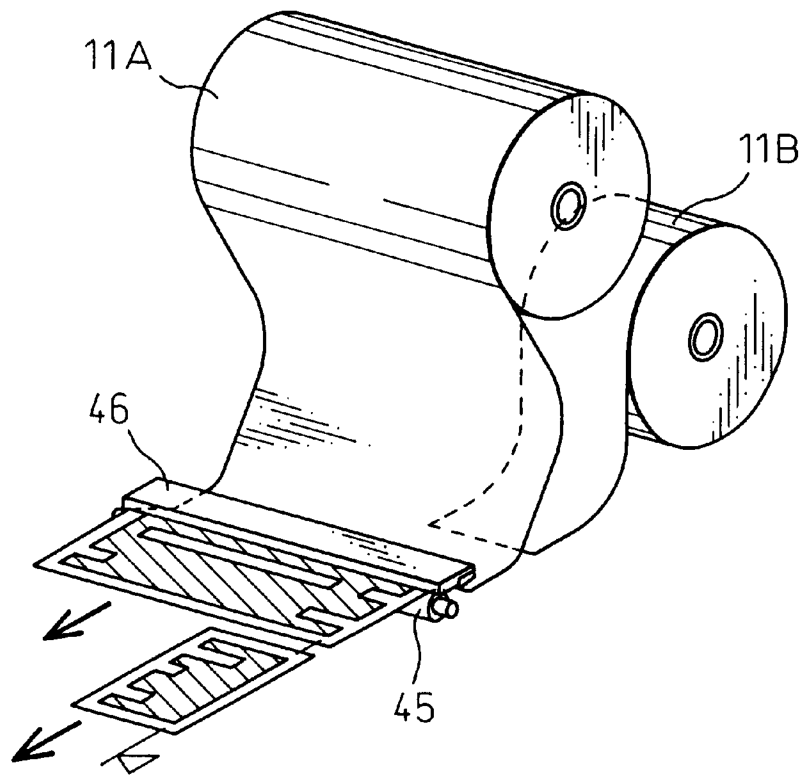

Now, the printing reference for the printing section of the printer unit 40 described above will be explained. FIG. 9A shows the printing reference and the printing area of each of the paper rolls 11A and 11B arranged in tandem along the length of the medium issuing apparatus 10 as explained with reference to FIG. 2. An explanation will be given here of the case in which the paper roll 11A is wide and the paper roll 11B is narrow.

The roll paper 11A passes through the first transport path 47A described with reference to FIG. 8 and arrives at the platen 45 and the printing head 46 in an opposed relation to the platen 45. The roll paper 11B, on the other hand, passes through the second transport path 47B and arrives at the platen 45 and the printing head 46 in opposed relation to the platen 45. In spite of the fact that the paper roll 11A is wide and the paper roll 11B is narrow, the roll paper 11A and 11B have a common print reference position on the left side along the direction of transport of the roll paper 11A and 11B as indicated by triangular marks. The areas of the paper rolls 11A and 11B printed by the printing head 46 and the platen 45 are hatched and correspond to the width of the paper rolls 11A and 11B, respectively.

Figure 9B:
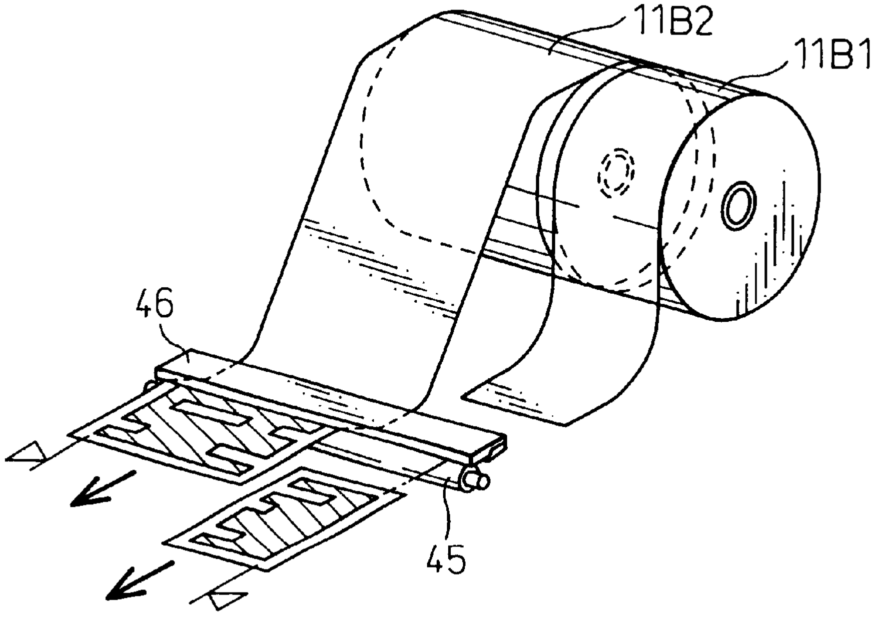

In the case where the paper rolls 11A and 11B are arranged in juxtaposition with respect to the length of the medium issuing apparatus 10 as described with reference to FIG. 7, on the other hand, the print reference position and the printing area of the paper rolls 11A and 11B are as shown in FIG. 9B. An explanation will be given here of the case in which the paper roll 11B1 is narrow and the paper roll 11B2 is wide.

The paper from the paper roll 11B1 passes through the second transport path 47B described with reference to FIG. 8 (the transport path L in FIG. 7) and arrives at the platen 45 and the printing head 46 in opposed relation to the platen 45. The paper from the roll paper 11B2 , on the other hand, passes through the first transport path 47A (the transport path U in FIG. 7A) and arrives at the platen 45 and the printing head 46 in opposed relation to the platen 45. In this embodiment, the wide paper roll 11B2 is located on the right side and the narrow paper roll 11B1 is located on the left side as viewed in the direction of transportation. In such a case as this, the print reference position of the paper roll 11B1 is preset on the left side and that of the paper roll 11B2 is present on the right side as viewed in the direction of transportation as indicated by triangular marks. The areas of the paper rolls 11B1 and 11B2 printed by the printing head 46 and the platen 45 are hatched and correspond to the width of the paper rolls 11B1 and 11B2, respectively.

(D) Configuration of paper roll insertion guide and example application The paper roll insertion guide members 70 used for inserting the roll paper smoothly into the printer unit 40 and an application thereof will be explained with reference to FIGS. 10A to 12D.

Figure 10A:
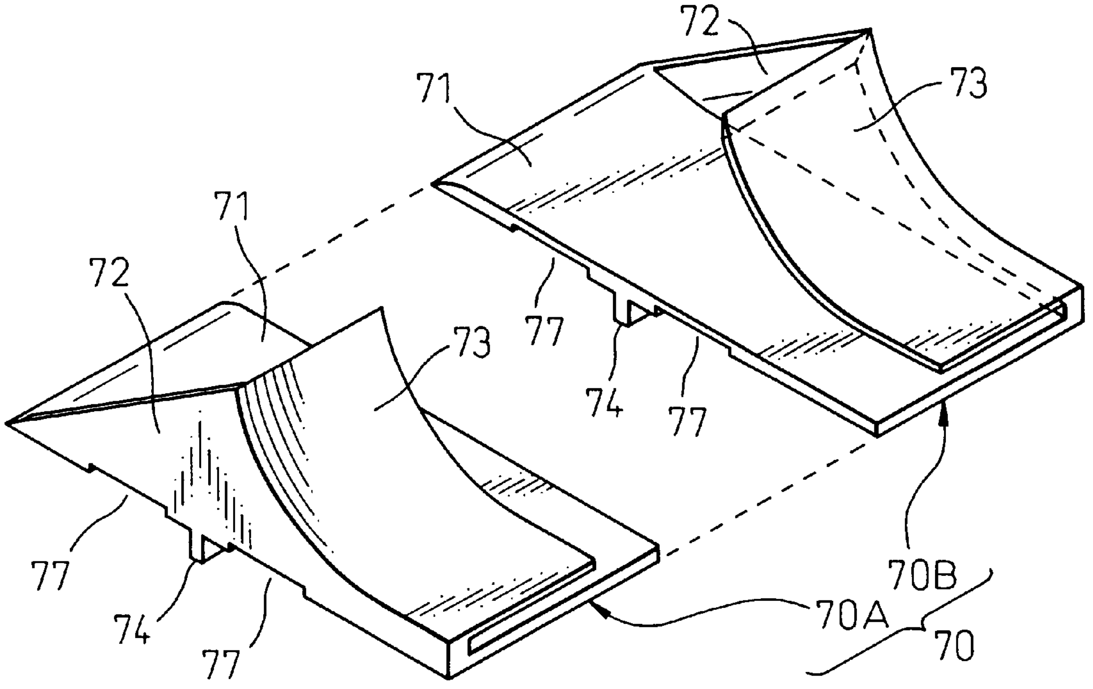
FIG. 10A is a perspective view showing a configuration of the paper roll insertion guide members used in pair.
Figure 10B:
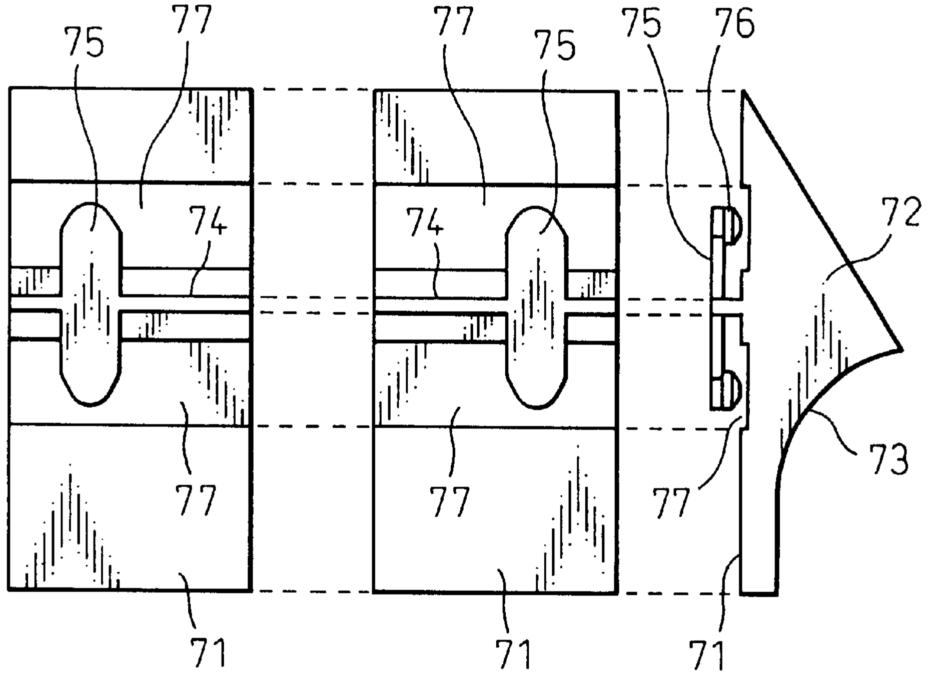
FIG. 10B is a bottom view and a side view of the insertion guide member of FIG. 10A.

FIGS. 10A and 10B show a detailed configuration of the roll paper insertion guide members 70 of FIG. 8. As shown in FIG. 10A, the insertion guide members 70 are configured with two insertion guide members 70A and 70B symmetric about a plane with respect to each other, which guide members are always used as a pair.

The insertion guide members 70 each include a rectangular base plate 71 having a predetermined thickness, a side wall 72 protruded toward one side along the length of the base plate 71, a guide plate 73 protruded toward the base plate 71 from one of the ridges of the side wall 72, a slide wall 74 having a uniform thickness protruded along the width on the reverse side of the base plate 71, two arms 75 protruded toward the two sides of the slide wall 74, a stopper 76 protruded toward the base plate 71 at the forward end of each arm 75, and two grooves 77 formed in parallel to the slide wall 74 on the two sides of the slide wall 74. Each side wall 72 is configured with a bottom side, a linear sloped side and a gently curved side from the top of the slope toward the bottom side. The guide plate 73 is arranged over the whole length of the curved side, and has a width smaller than that of the base plate 71. Also, a large opening is formed on the side of the guide plate 73 nearer to the top of the side wall 72, while the bottom side of the side wall 72 has a slit of a size allowing the medium to pass through.

FIGS. 11A to 12D are diagrams for explaining the manner in which the paper roll insertion guide member 70 is used in the third mounting section 40C and a lock mechanism for the insertion guide member 70. In the diagrams, the arrow X indicates the direction in which the paper rolls are inserted, and the two-dot chains indicate the position of the paper rolls. As explained with reference to FIG. 8, the insertion guide members 70 are arranged at the inlets of the first transport path 47A and the second transport path 47B1. Thus, the angle at which the paper rolls are introduced from many directions is increased, and the range of leading the medium (paper rolls) is set to, say, about 90 degrees as shown in FIG. 11C, thereby permitting the paper rolls to be inserted into the first transport path 47A and the second transport path 47B without any jamming.

Figure 11A:
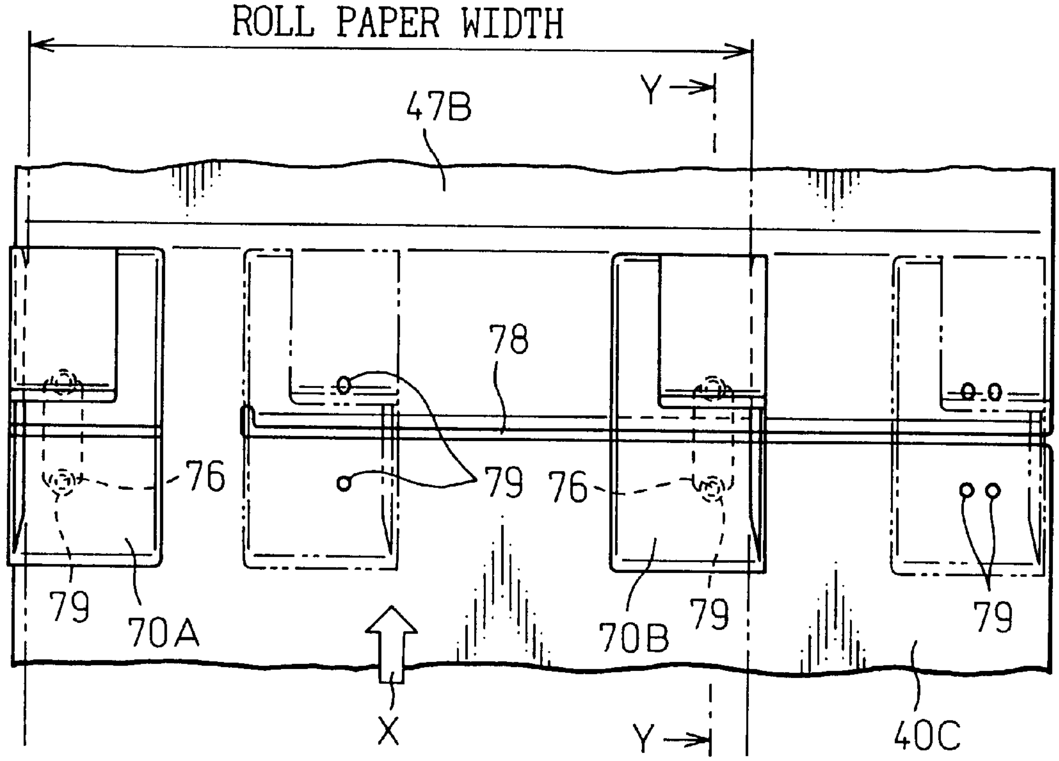
FIG. 11A is a partial plan view showing the manner in which the paper roll insertion guide member is used.
Figure 11B:
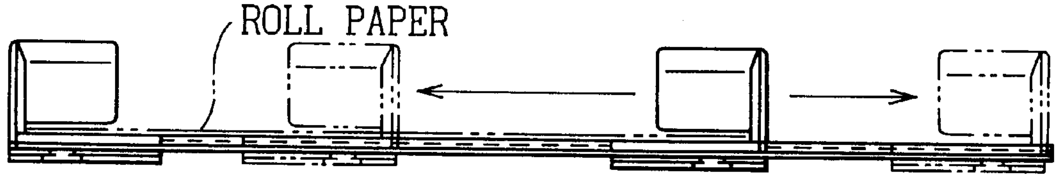
FIG. 11B is a side view of FIG. 11A.

In the example shown in FIGS. 11A and 11B, the insertion guide member 70A is fixed at an end of the third mounting section 40C, and the other insertion guide member 70B is adapted to move in accordance with the width of the medium inserted into the second transport path 47B. For this purpose, a slit 78 is formed on the third mounting section 40C for sliding the insertion guide member 70B. The insertion guide member 70B is mounted on the third mounting section 40C with the slide wall 74 thereof inserted in the slit 78. As a result, the insertion guide member 70B can be moved to the position indicated by two-dot chain from the position indicated by solid line as shown in FIGS. 11A and 11B.

Figure 11C:
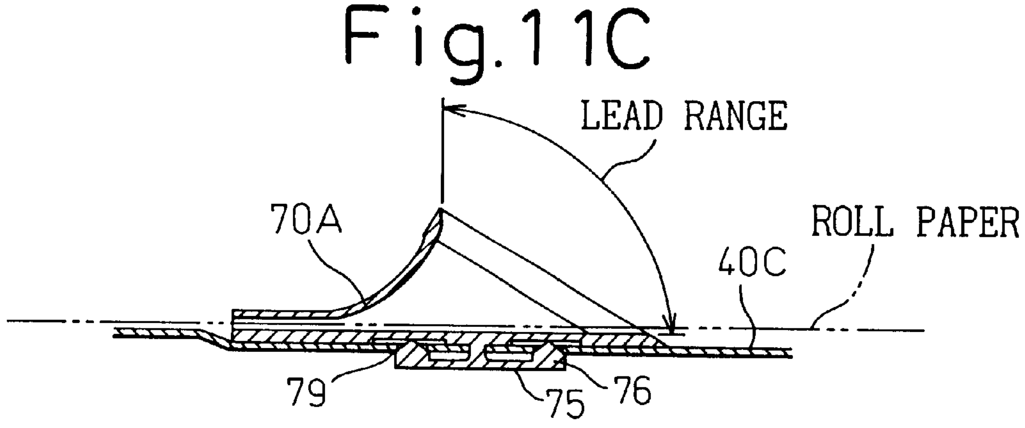
FIG. 11C is a sectional view for explaining a lock mechanism for the insertion guide member.

The insertion guide members 70A and 70B are fixed on the third mounting section 40C by inserting the stoppers 76 of the insertion guide members 70A and 70B into the lock holes 79 formed in the third mounting section 40C, as shown in FIG. 11C. The lock holes 79 are formed in the third mounting section 40C in a size conforming with the medium size.

Figure 12A:
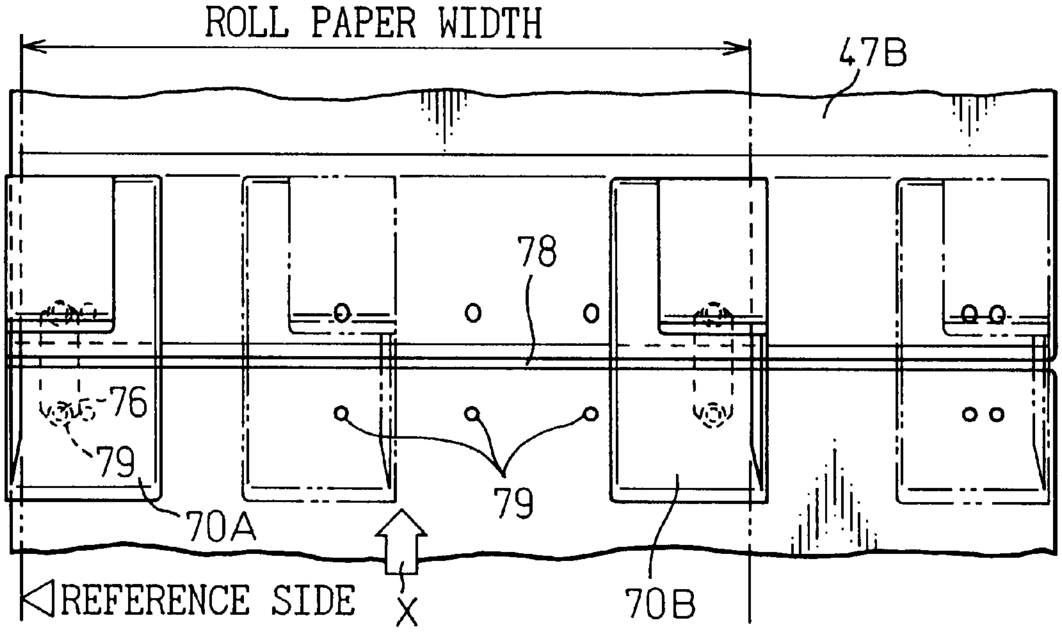
FIG. 12A is a partial plan view showing the manner in which the paper roll insertion guide member is used in another way.
Figure 12B:
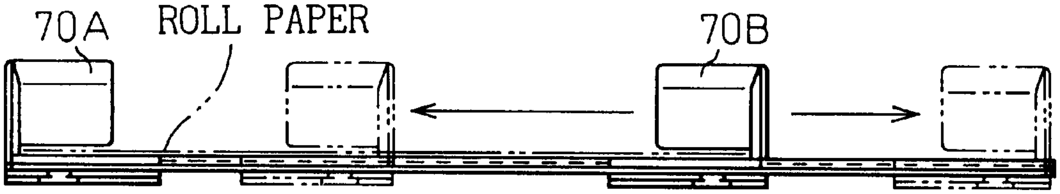
FIG. 12B is a side view of FIG. 12A.
Figure 12C:
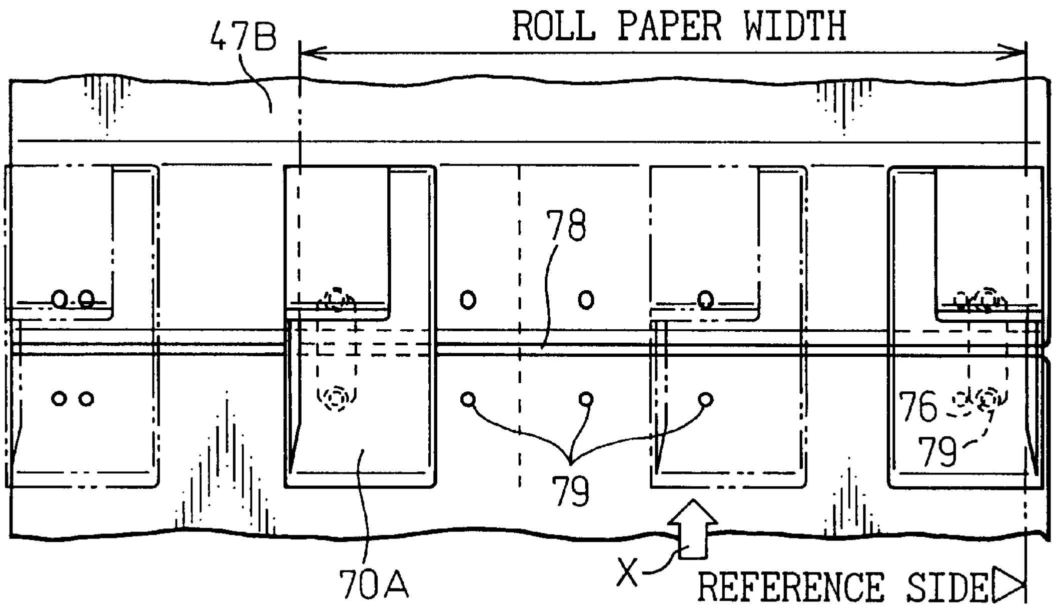
FIG. 12C is a partial plan view showing the manner in which the paper roll insertion guide member is used in still another way.
Figure 12D:
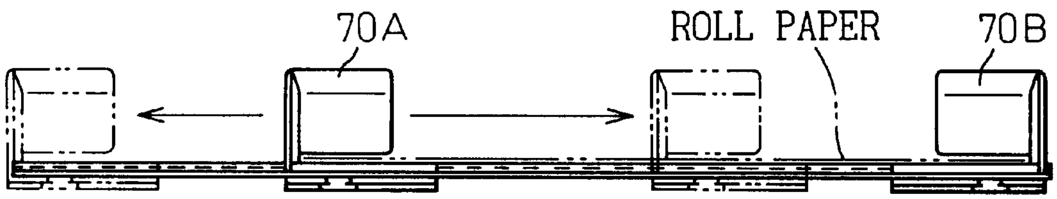
FIG. 12D is a side view of FIG. 12A.

Unlike in the embodiment shown in FIG. 11A in which the slit 78 is formed only in a range where the insertion guide member 70B is movable, the slit 78 may alternatively be formed over the whole width of the second transport path 47B as shown in FIGS. 12A and 12C. The provision of the lock holes 79 at appropriate positions in the third mounting section 40C permits the insertion guide member 70A to be fixed on the left side of the medium as viewed in the direction of insertion as shown in FIG. 12A and the insertion guide member 70B to move to the position indicated by two-dot chain in accordance with the medium size as shown in FIGS. 12A and 12B. As another alternative, the insertion guide 70B can be fixed on the right side of the medium in the direction of insertion as shown in FIG. 12C on the one hand, and the insertion guide member 70A can be adapted to move up to the position indicted by two-dot chain in accordance with the medium size as shown in FIGS. 12C and 12D on the other hand.

Also, various combinations of the tandem arrangement and juxtaposition of the paper rolls are rendered possible by a configuration in which the positions of the reference insertion guide members 70A and 70B can be changed to the right and left sides as viewed in the direction of paper roll insertion as explained with reference to FIGS. 12A to 12D.

It is also possible to employ the configuration of the embodiment explained with reference to FIGS. 11A and 11B as a configuration of the second transport path 47B, and the configuration of the embodiment explained with reference to FIGS. 11A to 11D as a configuration of the first transport path 47A.

(E) Configuration of cutter section

Figure 13:
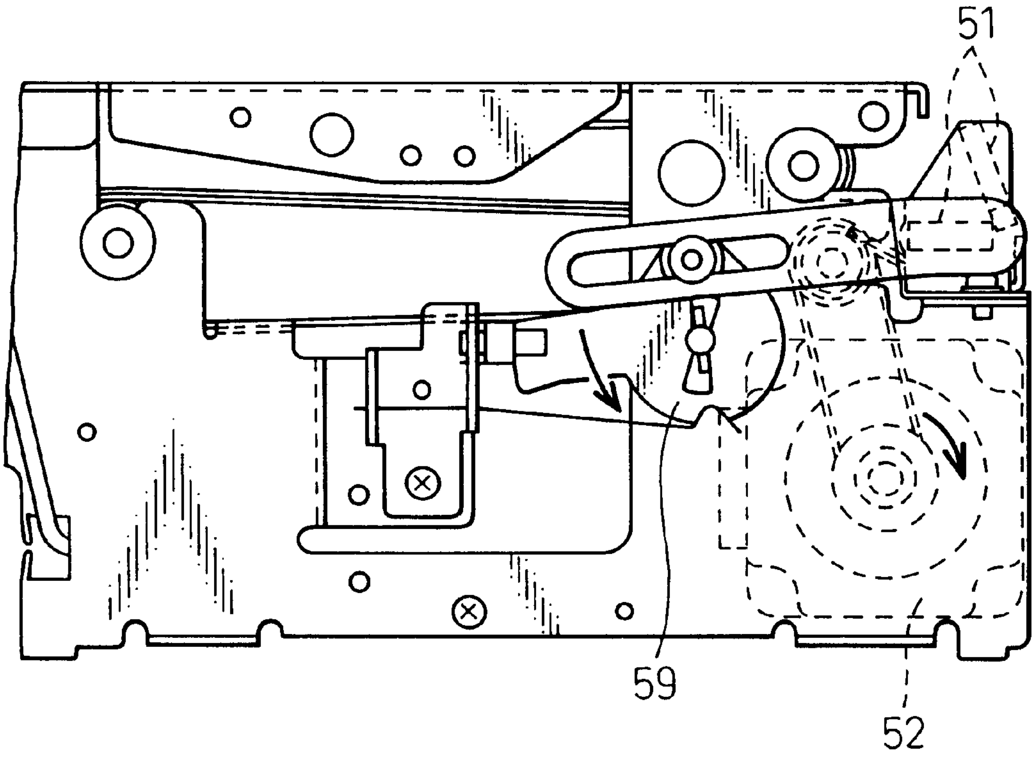
FIG. 13 is a side view showing the cutter section in detail.

The configuration of the cutter section at the inlet of the feeder unit 50 will be explained. FIG. 13 shows the cutter section in detail. A cutter blade 51 of the cutter section is driven by a cut feed motor 52 arranged at the inlet of the feeder unit 50. The cut feed motor 52 also drives the medium transport mechanism described later.

With the rotation of the cut feed motor 51 in the direction opposite to the arrow, a unidirectional clutch not shown is coupled to move the transport belt and thus transport the medium toward the outlet. When the cut feed motor 51 is rotated in the direction of arrow, by contrast, another unidirectional clutch not shown is coupled to rotate a cam 59 in the direction of arrow and activate the cutter blade 51 for cutting the medium.

(F) Configuration of feeder unit

Figure 14:
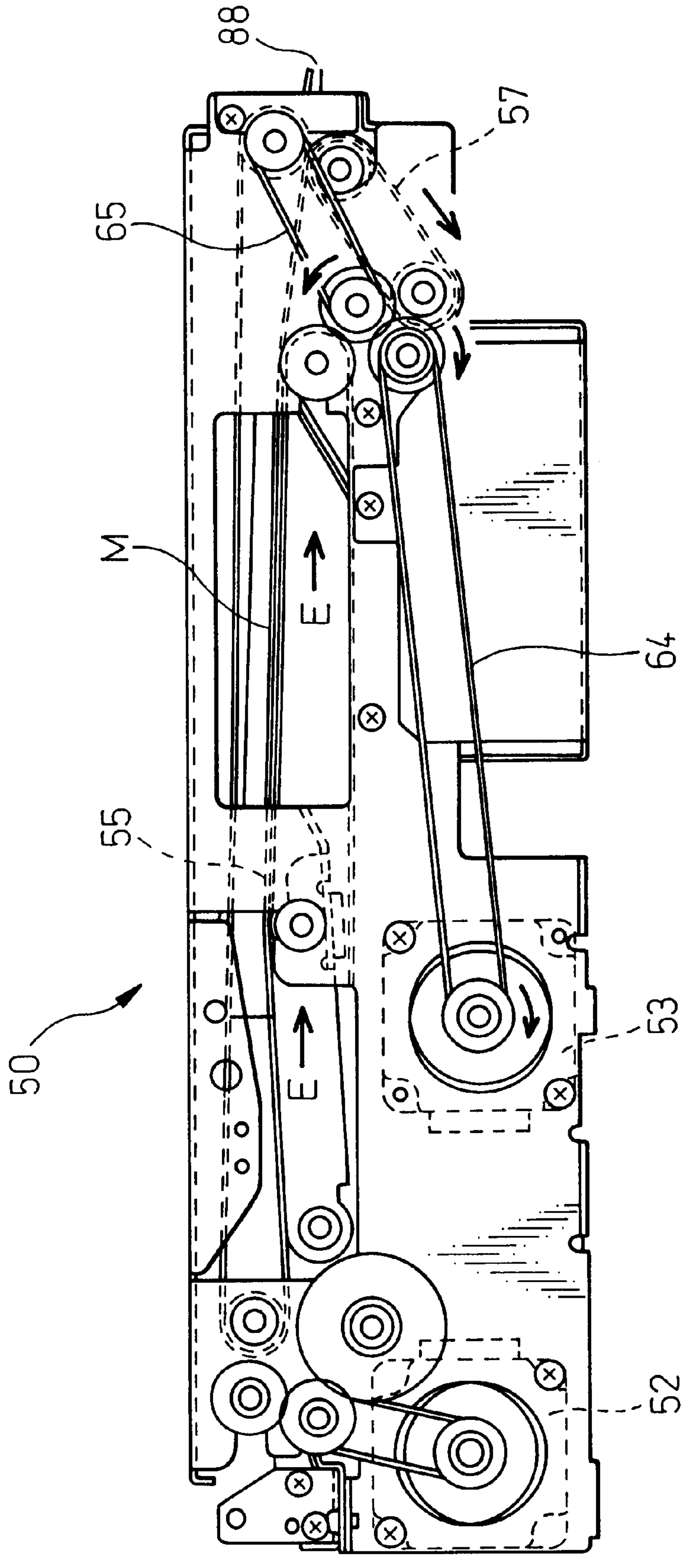
FIG. 14 is a diagram showing a general configuration of the feeder section.

FIG. 14 shows a configuration of the feeder unit 50 as viewed from the opposite side of the same unit 50 shown in FIG. 2. Thus, the medium M is transported rightward on the page and a common ejection opening 88 of the medium M is located at the right end. This diagram shows the relative positions of the cut feed motor 52, a receipt delivery motor 53, a transport belt 55, a recovery belt 57 and relay belts 64 and 65.

The transport belt 55 is driven by the rotation of the cut feed motor 52, so that the medium M is transported along the direction of arrow E. The turning effort of the receipt delivery motor 53, when rotated in the direction of arrow, is transmitted to the recovery belt 57 as the relay belts 64 and 65 rotate in the direction of the arrow. The recovery belt 57 causes the medium M transported by the transport belt 55 to be ejected out of the common ejection opening 88 or recovered in the recovery box described later.

(G) Configuration and operation of temporary storage section

The medium M printed by the printer unit 40 and cut off by the cutter blade 51 can be ejected collectively in a bundle by the medium issuing apparatus 10 according to the present invention. For bundling the medium M thus cut, the medium issuing apparatus 10 includes a temporary storage section 80. This temporary storage section 80 will be explained with reference to FIGS. 15 to 16B.

Figure 15:
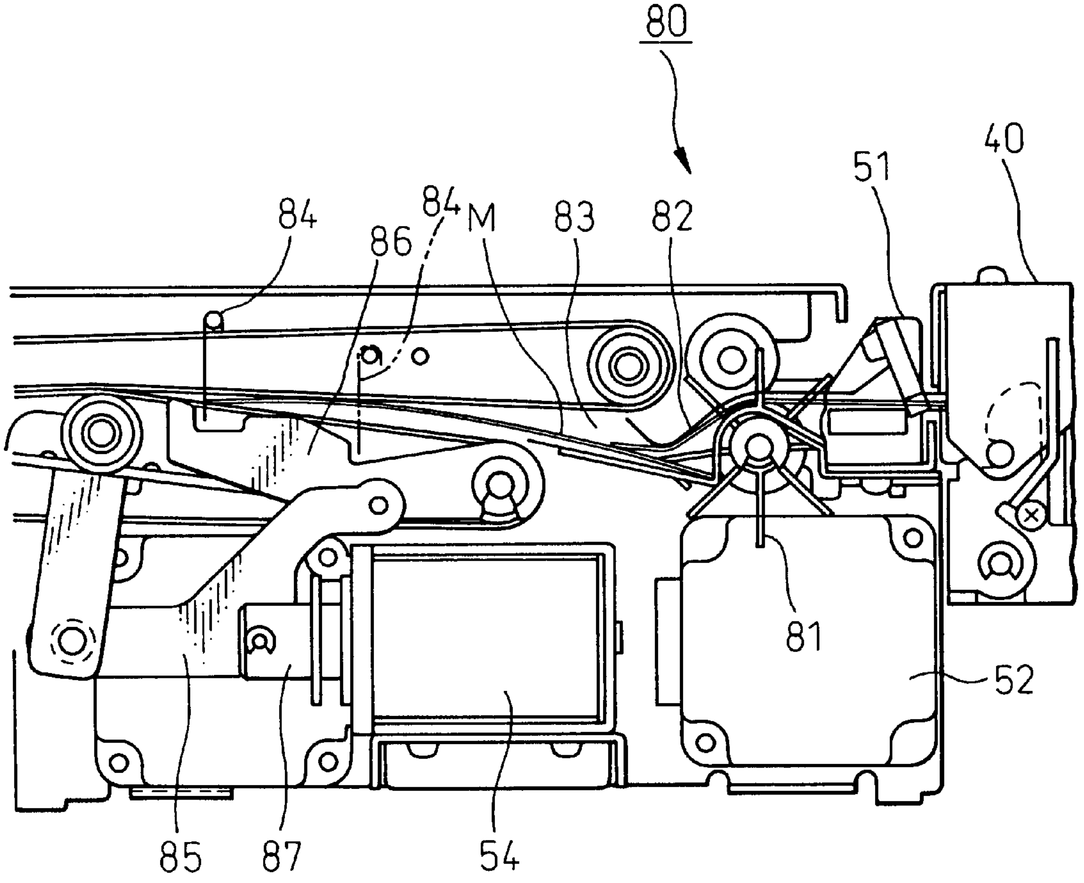
FIG. 15 is a side view showing the temporary storage section in detail.
Figure 16A:
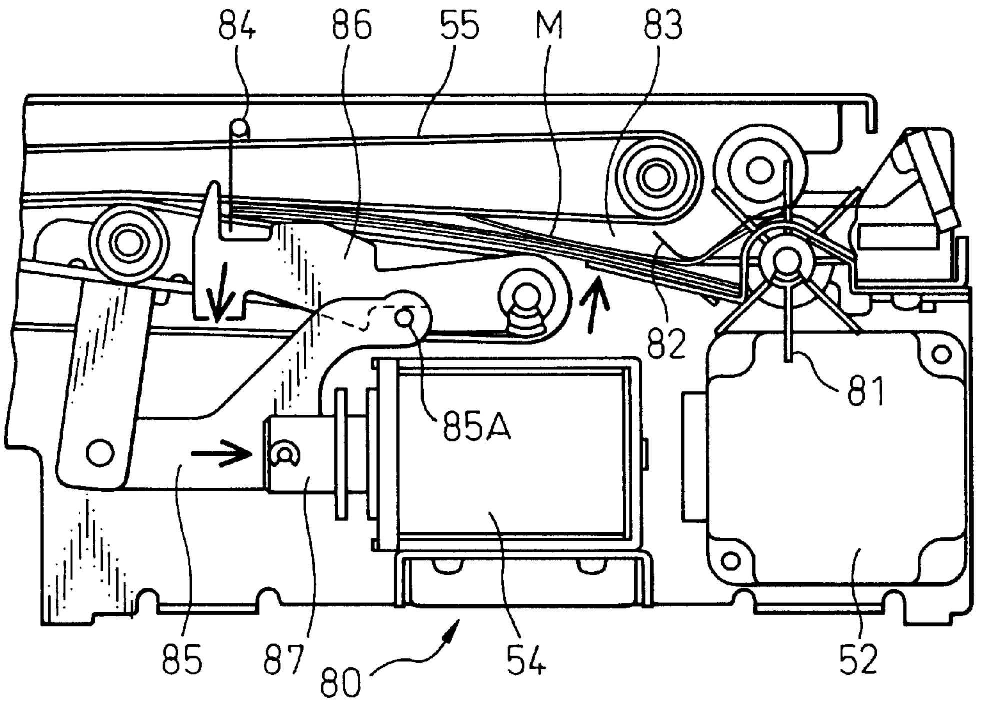

FIG. 15 shows a configuration of the temporary storage section 80 which is located downstream of the cutter blade 51. An impeller 81 and a guide member 51 are arranged at the inlet of the temporary storage unit. The medium M cut off by the cutter blade 51 is transported by the impeller 81 and stored in the temporary storage space 83 along the guide member 82. A stopper 84 is arranged at the outlet of the temporary storage space 83. The medium M that has been transported to the temporary storage space 83 is blocked from farther transportation by the stopper 84. Thus, the medium M cut off by the cutter blade 51 comes to be stored and bundled in the temporary storage section 83.

The mounting position of the stopper 84 can be changed in accordance with the length of the medium M. The stopper 84 indicated by the solid line in FIG. 15 corresponds to the A4-sized medium M. In the case where the medium M is of dual length, the stopper 84 can be relocated to the position indicated by two-dot chain. The stopper 84 can secured by an E ring. The lever 86 can be used as it is.

A solenoid 54 is arranged under the temporary storage space 83 of the temporary storage section 80. The solenoid 54 includes a lever 86 and a link mechanism 85 for unlocking the stopper 84. The link mechanism 85 engages the plunger 87 of the solenoid 54.

Figure 16B:
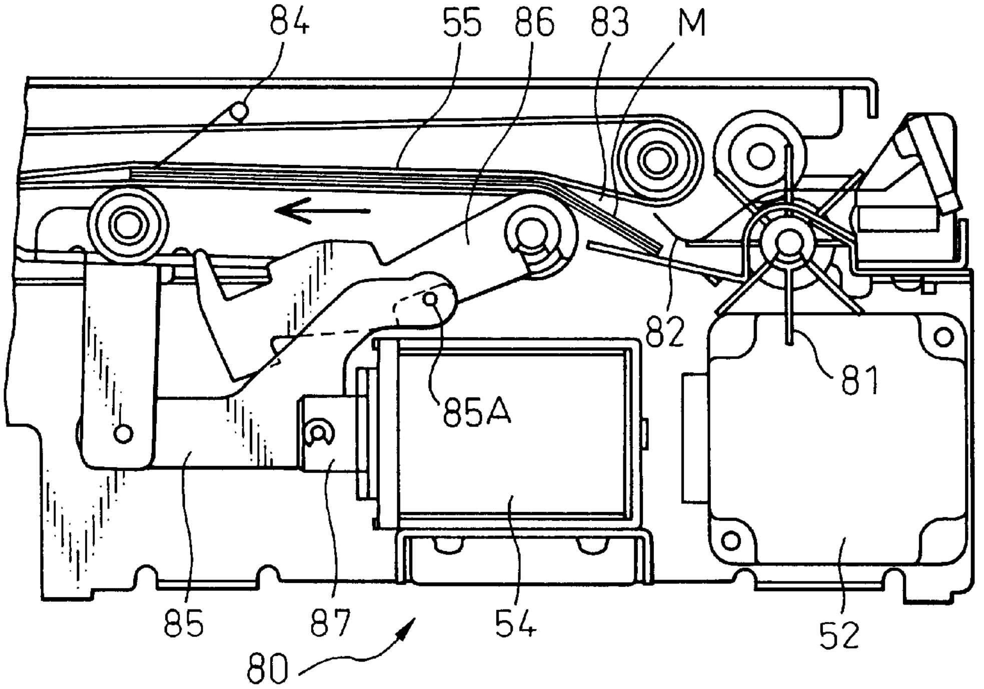

Once the medium M is stored to a predetermined amount in the temporary storage space 83, the solenoid 54 is energized in response to an instruction from a control circuit not shown. The energization of the solenoid 54 moves a plunger 87 in the direction of arrow shown in FIG. 16A. The lever 86 is supported on a rod 85A protruded from the link mechanism 85. When the rod 5A is moved by the motion of the plunger 87, the lever 86 naturally drops in such a way as to rotate in the direction of arrow. As shown in FIG. 16B, as long as the plunger 87 is contained in the solenoid 54 as shown in FIG. 16B, the stopper 84 thus far locked by the lever 86 is unlocked. Then, the transport mechanism 55 operates in such a manner that the bundle of the medium M stored in the temporary storage space 83 rotates the stopper 84 and is ejected from the temporary storage space 83.

Once the plunger 54 is turned off, the plunger 87, the link mechanism 85 and the lever 86 are restored to the state shown in FIG. 15, and the stopper 84 is locked again by the lever 86. Then, the medium M cut off is stored and bundled again in the temporary storage space 83. The expression "bundle" indicates the state in which cut media M are stacked but not the state in which the media M are bundled with a band.

(H) Configuration of common ejection opening and medium recovery operation

A bundle of the medium M ejected from the temporary storage section 80 is transported to a point before the common ejection opening 88 by the transport belt. The medium M, however, is not ejected as it is but by the operation of the recovery belt 57. The medium M not collected by the customer, on the other hand, is recovered into the recovery box 58 by the recovery belt 57. The configuration of the supply/ejection opening 88 and the neighborhood thereof and the medium ejection and recovery operation will be explained with reference to FIGS. 17A to 18C.

Figure 17A:
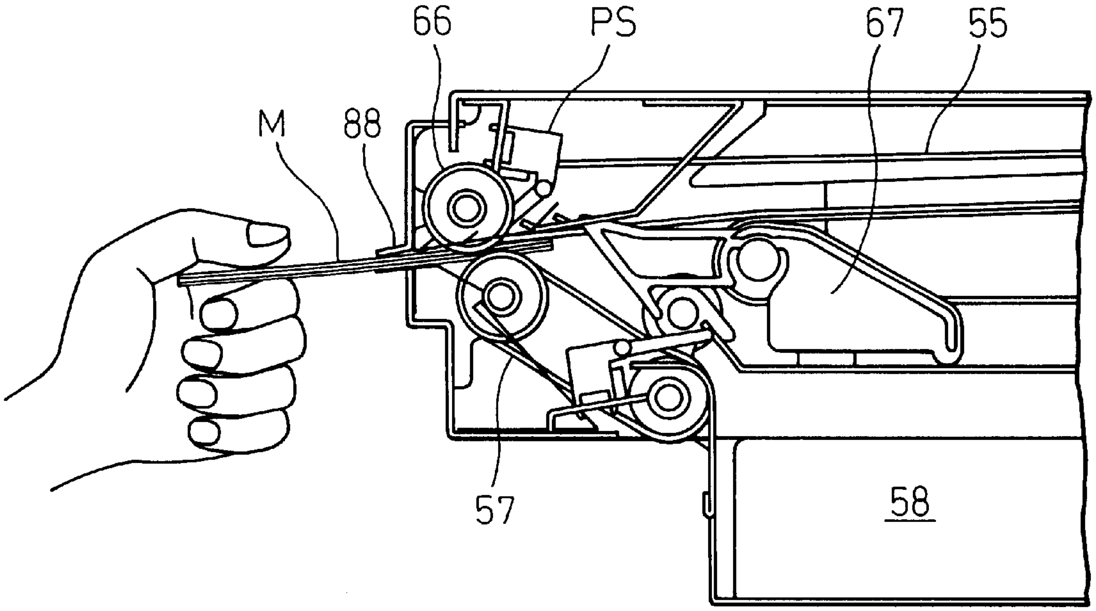
FIG. 17A is a diagram for explaining the manner in which the medium transported in a bundle from the temporary storage section is recovered from the common ejection opening.

FIG. 17A is a diagram for explaining the manner in which the bundle of the medium M transported from the temporary storage section 80 is collected from the common ejection opening 88. The medium M transported from the temporary storage section 80 by the transport belt 55 stops before the common ejection opening 88, after which the forward end of the medium M is protruded from the common ejection opening 88 by the rotation of the ejection roller 66 and the recovery belt 57. Under this condition, the customer can collect the bundled medium M protruded from the common ejection opening 88. An optical sensor PS is arranged upstream of the ejection roller 66 for detecting whether the medium M has been pulled out by the customer or remains uncollected.

Figure 17B:
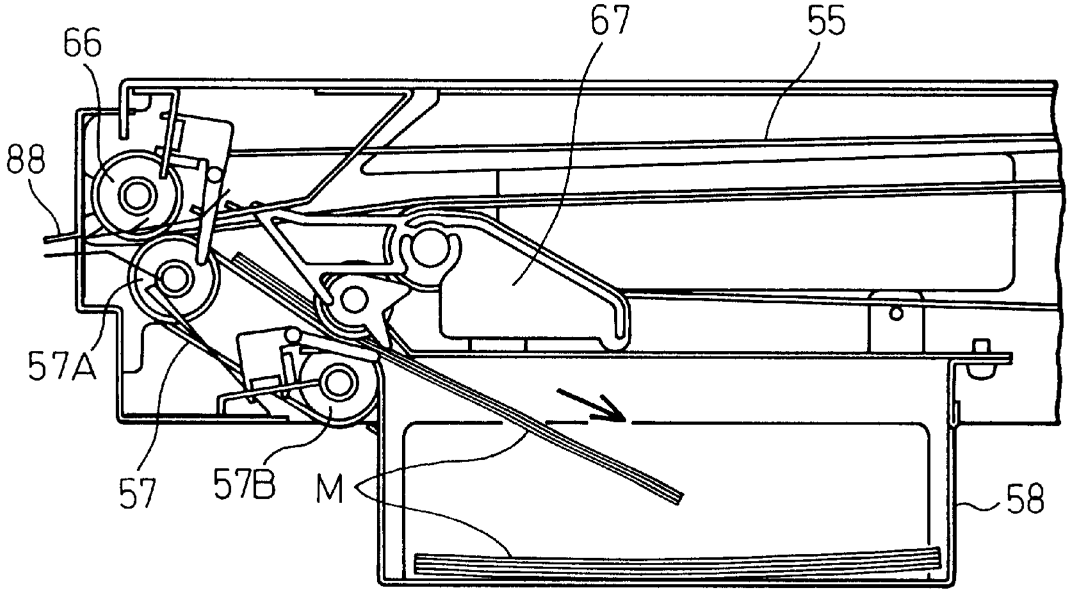
FIG. 17B is a diagram for explaining the manner in which the medium left at the common ejection opening is recovered in the recovery box.

In the case where the medium M is not collected by the customer at the common ejection opening 88, as shown in FIG. 17B, the ejection roller 66 and the recovery belt 57 rotate in the opposite direction, so that a free gate 67 opens thereby making it possible to recover the medium M into the recovery box 58.

In the embodiment shown in FIG. 17B, the recovery belt 57 is suspended between the rollers 57A and 57B. These rollers are a simple roller. With the rotation of the two rollers 57A and 57B and the resulting movement of the belt 57, therefore, the medium M is recovered as it is into the recovery box 58.

The size of the recovery box 58 for recovering the forgot medium M is limited by the space occupied by the apparatus and may not be sufficiently large. In many cases, therefore, the recovery box 58 has a minimum size, and as much media as possible is required to be recovered in this limited space. However, the medium M, when produced by cutting off the roll paper, is often curled as shown in FIG. 17B. The medium M, once curled, fails to advance smoothly into the recovery box 58 or further reduces the number of the media A that can be held in the recovery box 58.

Figure 18A:
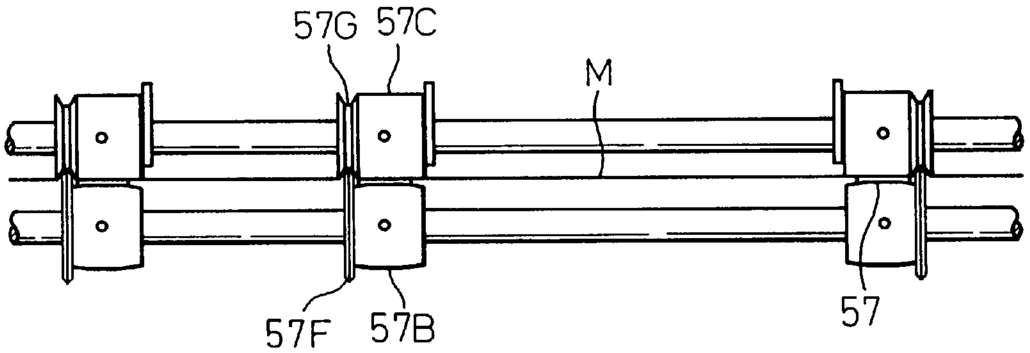
FIG. 18A is a diagram partially showing the shape of a roller for the recovery belt and an opposed roller.
Figure 18B:
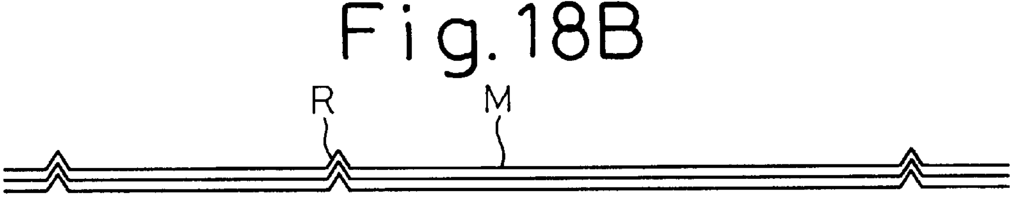
FIG. 18B is a diagram showing the shape of the medium that has passed between the rollers of FIG. 18A.
Figure 18C:
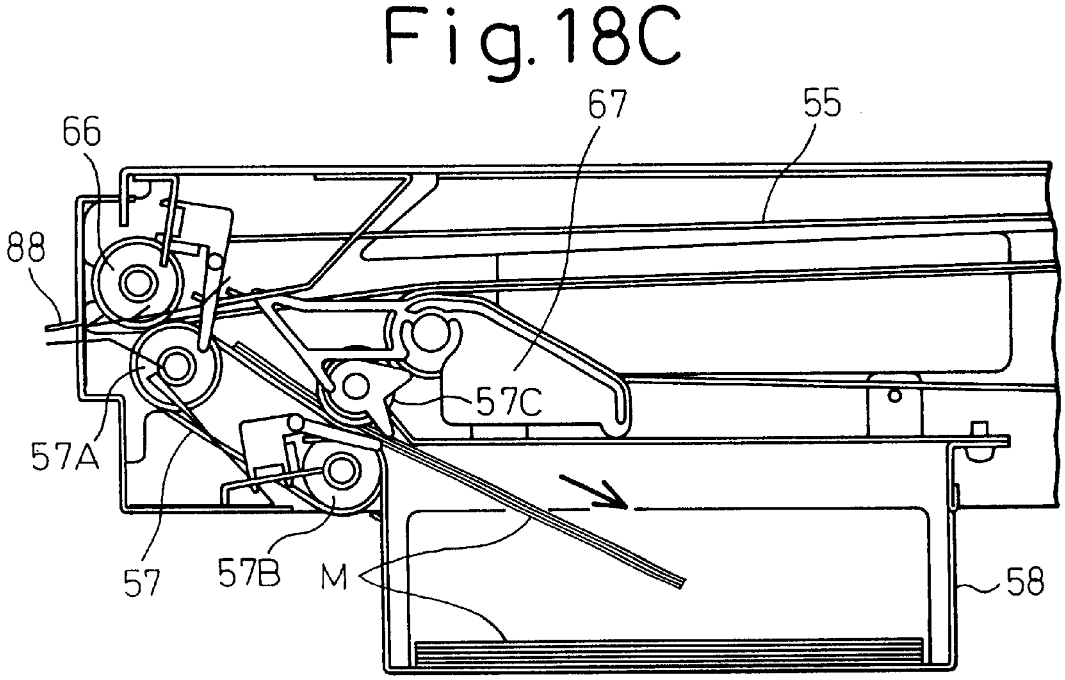
FIG. 18C is a diagram for explaining the manner in which the medium is recovered at the common receiving section having the recovery belt and the rollers shown in FIG. 18A.

FIGS. 18A to 18C show a configuration of the recovery belt 57 used to eliminate the curling of the medium M according to this embodiment. In this embodiment, a circumferential groove 57G as shown in FIG. 18A is formed on the roller 57C opposed to the roller 57B located on the recovery box 58. The sectional shape of the circumferential groove 57G is trapezoidal in the embodiment. On the other hand, a flange 57F is protruded at the portion of the roller 57B facing the roller 57C and opposed to the circumferential groove 57G. The flange 57F has a wedge-shaped section, and can have such a height that the forward end of the medium M held between the roller 57B and the roller 57C is fitted in the circumferential groove 57G.

In the case where the roller 57B and the roller 57C are formed in this way, a rib-shaped portion R is formed at predetermined places of the medium M, as shown in FIG. 18B, after the bundled medium M passes between the roller 57B and the roller 57C. This rib-shaped portion R is formed in parallel to the direction in which the medium is transported, i.e. such a direction as to prevent the medium M from curling. This rib-shaped portion R makes it more difficult for the medium M to curl and assures a fixed, steady direction in which the medium M advances into the recovery box 58.

As a result, the medium M formed with the rib-shaped portion R, as shown in FIG. 18C, is held in an orderly manner in the recovery box 58. The rib-shaped portion R has only a small height, and the protrusion of the rib-shaped portion R of a medium M is inserted in the recess formed in the rib-shaped portion R of another medium M located above. As a result, the total height of a multiplicity of the media M having the rib-shaped portion R recovered in the recovery box 58 is lower than the total height of the curled media M recovered in the recovery box 58. Thus, a greater number of the media M can be held in the limited internal space of the recovery box 58.

(I) Configuration of roll support bar

The configuration of the roll support bar suspended between the holding frames 12A and 12B to hold the paper rolls 11A and 11B will be explained with reference to FIGS. 19A and 19B.

Figure 19A:
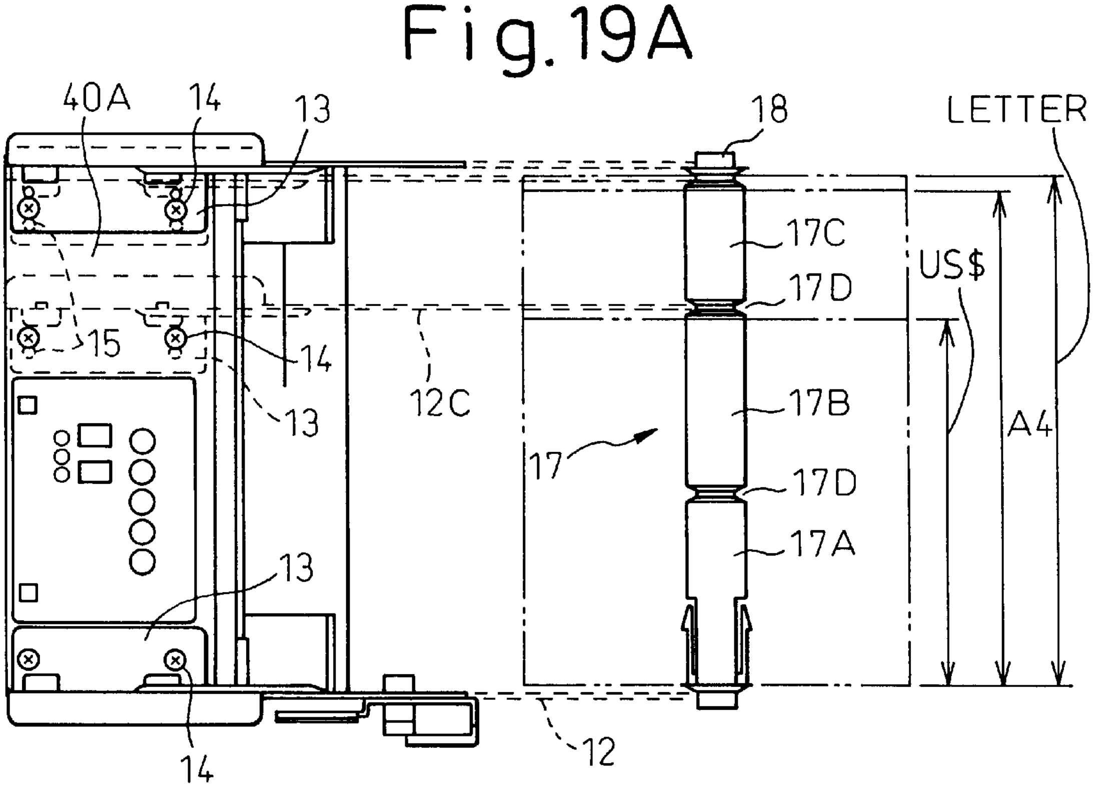
FIGS. 19A and 19B are diagrams for explaining a configuration of the roll support bar supporting the paper roll and the variations of the paper rolls mounted on the roll support bar.
Figure 19B:
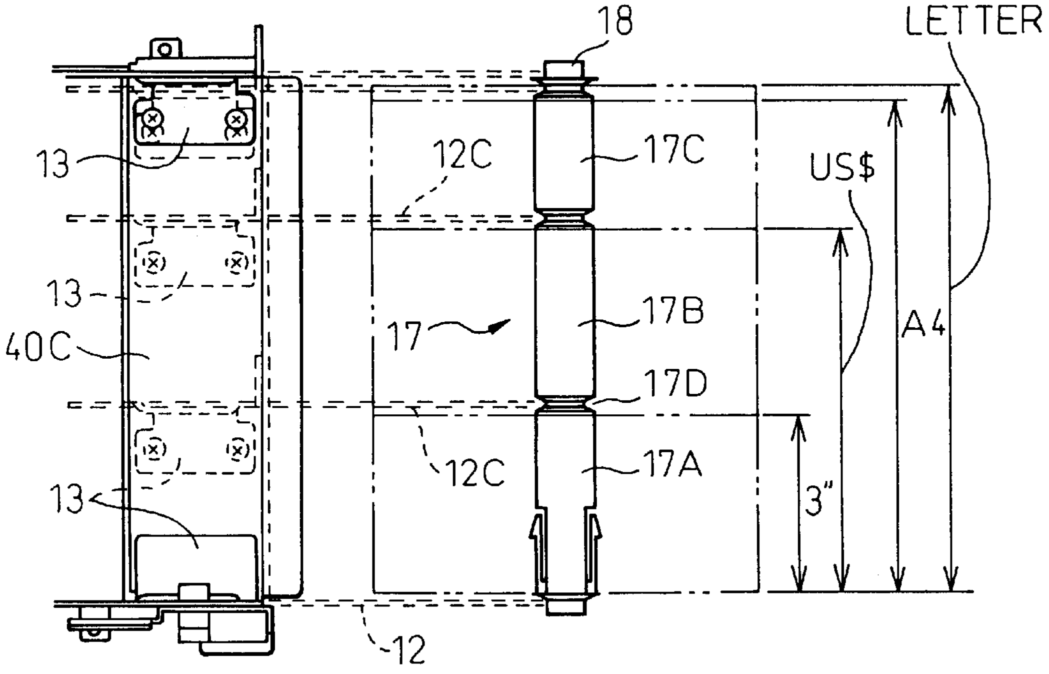

FIGS. 19A and 19B are diagrams for explaining the configuration of the roll support bar 17 for supporting the paper rolls 11A and 11B and variations of the paper rolls mounted on the roll support bar 17 according to the invention. As shown in FIG. 19A, a plurality of rollers 17A, 17B, and 17C capable of holding a plurality of paper rolls of different widths are rotatably mounted on the roll support bar 17 for supporting the paper rolls 11A and 11B. The rollers 17A, 17B, and 17C are adapted to rotate independently of each other on the support shaft 18. Each boundary between the rollers 17A, 17B, and 17C is formed with a circumferential groove 17D to permit the rollers to be mounted on the holding frames.

In the case where two types of paper rolls 11B1 and 11B2 having different widths are mounted on the holding frames 12B1 and 12B2 explained with reference to FIGS. 7A and 7B, for example, the two types of the holding frames 12B1 and 12B2 are prepared. According to this embodiment, on the other hand, one holding frame 12 having a width determined by taking the width of the largest medium into consideration is prepared. A roll support bar 17 having the rollers 17A, 17B, and 17C and the circumferential groove 17D is supported on the holding frame 12. At least one partitioning frame 12C separate from the holding frame 12 is prepared. The partitioning frame 12 has the same shape as the frames on the sides of the holding frame 12. A bracket 13 similar to the one for the holding frame 12 is arranged at the base of the partitioning frame 12C.

In the case where paper currency in US dollars is supported on the holding frame 12 as a paper roll, for example, the holding frame 12 is mounted by screws 14 on the first mounting section 40A, and then the forward end of the partitioning frame 12C is inserted into the circumferential groove 17D between the rollers 17B and 17C as shown in FIG. 19A. Under this condition, the bracket 13 at the base thereof is secured by the screws 14 to the mounting hole 15 formed on the first mounting hole 40A. By doing so, the holding frame 12 can support the paper roll of the paper currency in US dollars. Specifically, by inserting the forward end of the partitioning frame 12C into the circumferential groove 17D in accordance with the width of the paper roll, the provision of the holding frame 12 and at least one partitioning frame 12C can hold media of various widths on the holding frame 12.

FIG. 19B shows an example in which two partitioning frames 12C are mounted on the holding frame 12. In this case, paper rolls of three different widths can be set on a single holding frame 12. In addition, economy is achieved since more than one holding frame is not required for different widths of the paper roll.

(J) Configuration of automatic teller machine using medium issuing apparatus

The medium issuing apparatus 10 having the aforementioned configuration can be used when built into the automatic teller machine 30. Such an example will be explained with reference to FIGS. 20 and 21.

Figure 20:
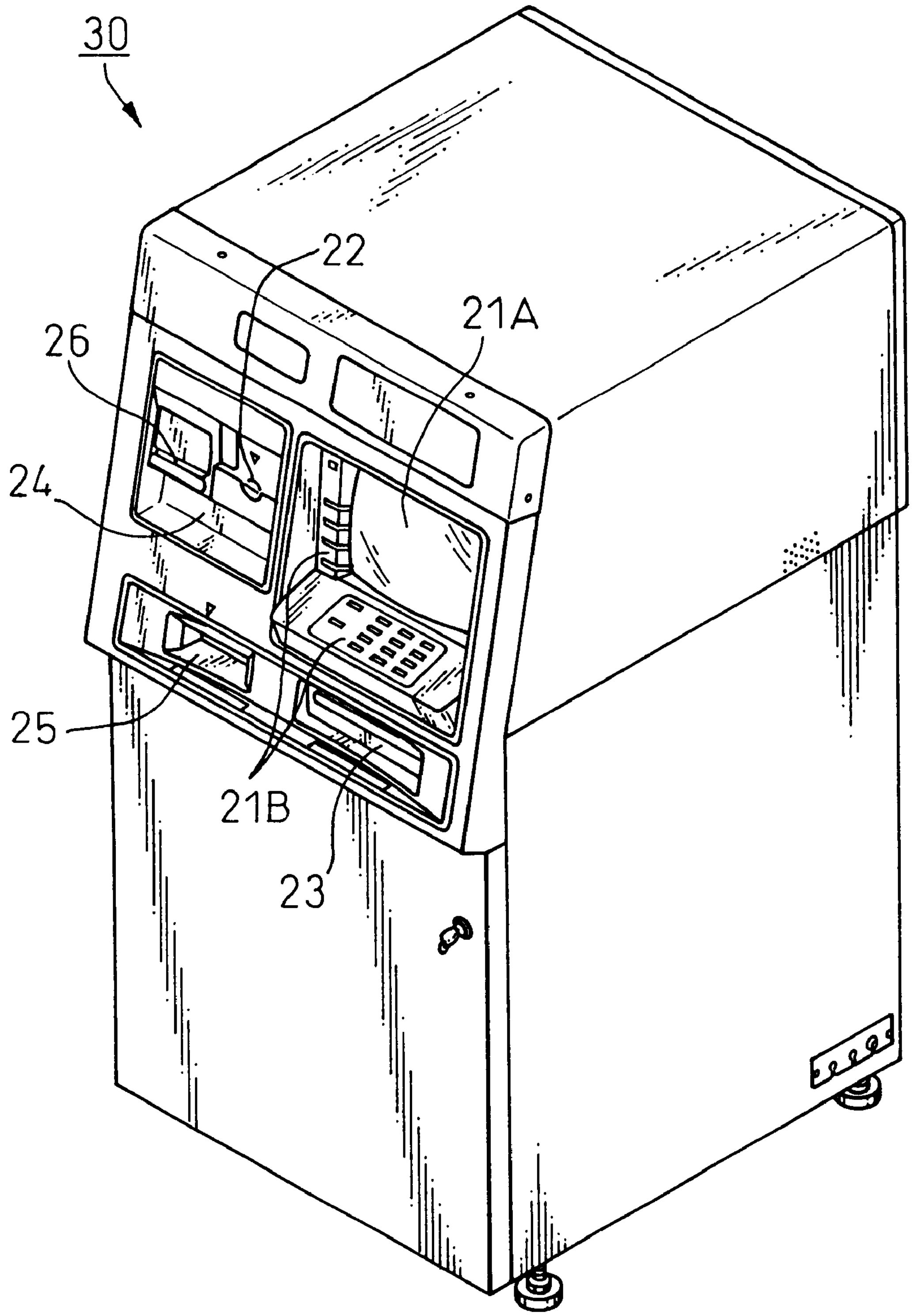
FIG. 20 is a perspective view showing the appearance of the automatic teller machine with the medium issuing apparatus using the paper roll medium according to the invention.

FIG. 20 is a perspective view showing the outer appearance of the automatic teller machine 30, having the medium issuing apparatus 10, using paper rolls as a medium. Numeral 21A designates a display screen to offer an operation guide to the operator. Numeral 21B designates input keys. The customer can proceed with his transaction by operating the keys 21B in accordance with the guide displayed on the display screen 12A. Numeral 22 designates a card insertion/ejection opening, through which the card is inserted by the customer intending to start a transaction and the card is delivered upon completion of the transaction. Numeral 23 designates a cash payout opening from which cash is paid in an account-settling transaction. Numeral 24 designates an envelope receiving opening in which envelopes for the envelop deposit are stored. The customer wanting to conduct an envelop deposit transaction takes out an envelope from the envelope receiving opening 24, and puts cash in the envelope for the envelope deposit transaction. Numeral 25 designates a cash deposit opening through which cash put in the envelope described above is inserted at the time of the envelope deposit transaction. Numeral 26 designates a receipt ejection opening through which a receipt, describing the specifics of the transaction conducted by the customer, is delivered.

Figure 21:
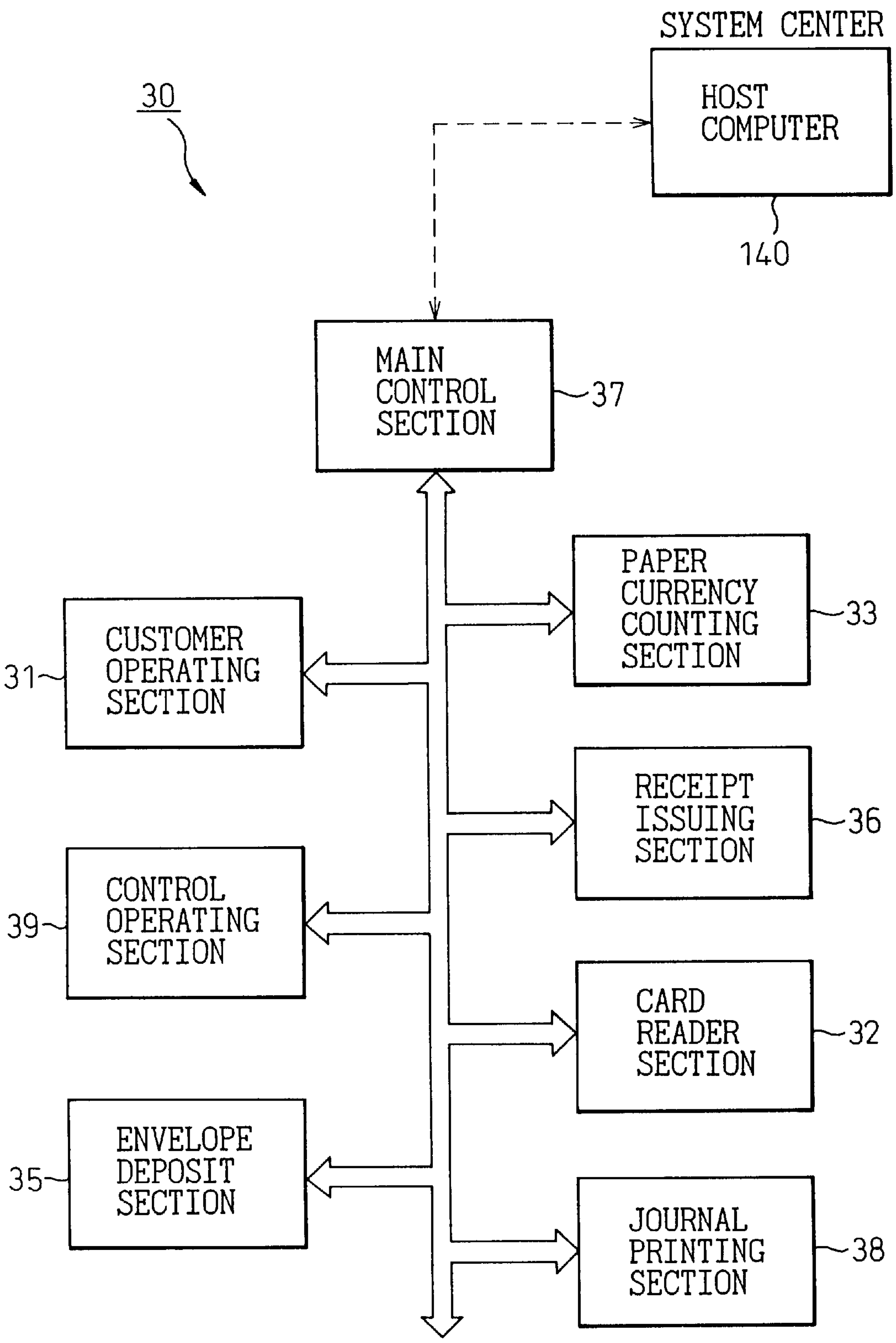
FIG. 21 is a block diagram showing the internal configuration of the automatic teller machine of FIG. 19.

FIG. 21 is a diagram showing an internal block configuration of the automatic teller machine 30 of FIG. 20. Numeral 31 designates a customer operating section for guiding the customer in the operation. The customer operates this section in accordance with the guide. The display screen 21A and the input keys 21B of FIG. 20 are included in the customer operating section 31. Numeral 32 designates a card reader section for reading the customer information recorded on the card inserted by the customer. The card insertion/ejection opening 22 of FIG. 20 is included in the card reader section 32. Numeral 33 designates a paper money counting section for storing the paper money to be paid out and releases the paper money at the time of a payout transaction. The cash payout opening 23 of FIG. 20 is included in the paper money counting section 33. Numeral 35 designates an envelope deposit unit for holding the paper money in the envelope at the time of a deposit transaction, and customer information read by the card reader section 32 is printed on this envelope. The cash deposit opening 25 of FIG. 20 is included in the envelope deposit unit 35.

Numeral 36 designates a receipt issuing section for issuing a receipt containing the prints of the specifics of the transaction conducted by the automatic teller machine 30. The receipt ejection opening 26 of FIG. 20 is included in the receipt issuing section 36. The receipt issuing section 36 has the function of issuing a medium printed with the service information in addition to the receipt. Numeral 37 designates a main control section for controlling the automatic teller machine 30 as a whole. The main control section 37 is connected to a host computer 140 of a system center through a communication line 34. Numeral 38 designates a journal printing section for storing the printing specifics of the transaction conducted by the automatic teller machine 30. Numeral 39 designates a control operating section for displaying the state of the automatic teller machine 30. Based on the displayed information, maintenance workers, including bank employees, perform the control operation. This control operating section 39, though arranged on the rear side of the automatic teller machine 30, can double as the customer operating section 31.

(K) Operation of automatic teller machine

The basic operation of the automatic teller machine 30 will be explained with reference to FIGS. 20 and 21.

(K-1) Withdrawal transaction

First, the customer inserts the card and, by use of the keys 21B, selects the withdrawal transaction from the transaction select screen displayed on the display screen 21A, and inputs his password. The main control section 37 substantiates the legitimacy of the customer by exchanging the password information input by the customer with the host computer 140 in the system center.

Once the legitimacy of the customer is substantiated, the main control section 37 causes the withdrawal amount screen to be displayed on the display screen 21A, and the customer inputs the withdrawal amount by operating the keys 21B. Then, the withdrawal amount input by way of the keys 21B and the customer information read by the card reader section 32 are transmitted by the main control section 37 to the host computer 140 of the system center thereby to determine the advisability of the designated withdrawal.

In the case where withdrawal is possible, the main control section 37 feeds out the paper money of the designated amount from the paper currency counting section 33 and ejects it from the cash payout opening 23. In the process, the control section 37 causes the transaction specifics to be printed by the receipt issuing section 36, and ejected as a receipt from the receipt ejection opening 26.

The customer information is sent to the host computer 140 of the system center, and at the time point when the withdrawal information indicates that the proposed transaction is possible, the account of the customer managed in the host computer 140 of the system center is updated to the contents after withdrawal.

(K-2) Envelope deposit transaction

The customer inserts the card and selects the envelope deposit transaction by the keys 21B from the transaction select screen displayed on the display screen 21A while at the same time inputting his password. The password input by the customer is notified by the main control section 37 to the host computer 140 of the system center to check the legitimacy of the customer, after which the cash withdrawal opening 25 is opened. The customer takes out the envelope from the envelope receiving opening 24, putting the paper money of the amount desired to be deposited and puts the envelope in the cash deposit opening 25. The main control section 37 closes the cash deposit opening 25 and causes the display screen 1A to display a screen making an inquiry about the deposit amount.

Once the deposit amount is input by way of the customer operating keys 21B, the main control section 37 transmits the deposit amount and the customer information read by the card reader section 32 to the system center. After checking the advisability of the deposit, and the customer information read by the card reader section 32 is printed and the envelope is closed. At the same time, the control section 37 prints the transaction specifics at the receipt issuing section 36 and causes it to be ejected from the receipt ejection opening 26 as a receipt.

Before the customer information is sent to the host computer 140 of the system center and it is determined that the deposit transaction is possible, the customer account managed by the host computer 140 of the system center is not updated. This is by reason of the fact that, in an envelope deposit, it cannot be determined whether the amount in the envelope coincides with the designated deposit amount. It is therefore only after the person in charge confirms the deposit, at the end of the working day, is the account of the customer updated. In the envelope deposit transaction, it is not necessarily cash that is put in the envelope, but checks or the like. The automatic teller machine 30 can handle transfer transaction as well as withdrawal and deposit transactions.

According to this embodiment, the service information can of course be printed and issued in addition to the receipt by the receipt issuing section 36.

As described above, according to the present invention, there are provided a medium issuing apparatus handling a paper roll medium, and an automatic teller machine using the apparatus, wherein the paper roll holding frames built in the printing unit and meeting various requirements can be replaced. Further, a paper roll insertion guide member is introduced, which is formed into the shape allowing the paper rolls to be inserted in wide directions. As a result, many variations meeting the customer conditions can be supplied by making it possible to change the paper roll position, the maximum winding outer diameter of the paper roll, the tandem arrangement or juxtaposition of the paper rolls, the paper roll width and the winding direction of the paper roll (up or down winding).

In addition, the introduction of the bundle release mechanism permits a plurality of paper pieces to be bundled and collectively released. Further, the freedom of the housing shape makes it possible to perform the maintenance operation on the two sides of the apparatus. Thus, the free design makes it possible to meet the customer demand when the medium issuing apparatus is built into the automatic teller machine.

What is claimed is:

1. A medium issuing apparatus using a paper roll medium, comprising:

- a paper roll holding section to hold a plurality of paper rolls;
- a plurality of paper roll drive mechanisms to feed-out and rewind each of said paper rolls;
- a common printing mechanism to print onto paper fed out by each of said paper roll drive mechanisms;
- a common cutting mechanism to cut each of said fed out papers into a predetermined length;
- a first common transport mechanism to transport the paper cut by said common cutting mechanism;
- a temporary storage section to store a plurality of cut papers transported by said first common transport mechanism and to compress the cut papers into a bundle;
- a second common transport mechanism to transport the bundled papers stored in said temporary storage section;
- a common ejection opening to eject the bundled papers transported by said second common transporting mechanism;
- a common receiving section to receive bundled papers remaining at the common ejection opening; and
- a control section to control the operation of the apparatus as a whole.

2. The medium issuing apparatus of claim 1, wherein a holding member to hold each of said paper rolls in said paper roll holding section is replaceable, and a plurality of said paper rolls can be arranged in tandem or juxtaposition in said apparatus.

3. The medium issuing apparatus of claim 1, wherein a holding member to hold each of said paper rolls in said paper roll holding section is replaceable, such that a supportable width for a plurality of said paper rolls is changeable.

4. The medium issuing apparatus of claim 1, wherein a plurality of said paper roll drive mechanisms each include paper roll insertion guide members with a curved slope in an opposed relation to a base surface of said apparatus in order to widen an angle to receive roll paper arriving from many directions.

5. The medium issuing apparatus of claim 1, wherein said control section controls said common printing mechanism to laterally reverse a printing reference position in accordance with a width of said paper rolls when a plurality of said paper rolls are arranged in juxtaposition.

6. The medium issuing apparatus of claim 1, wherein a medium transport mechanism of said common receiving section includes a pair of upper and lower medium transport rollers, a circumferential groove having a trapezoidal section formed at least at a predetermined position on one of said rollers, a flange having a wedge-shaped section with a forward end thereof advancing into said circumferential groove formed at a position on the other roller opposed to said circumferential groove, and a rib-shaped portion for preventing curling of paper after passing through said transport rollers.

7. The medium issuing apparatus of claim 1, wherein a plurality of said paper roll holding sections are each replaceable, and the remaining issuing section proper is small in size to facilitate the change in accordance with a holding space.

8. The medium issuing apparatus of claim 1, wherein a plurality of said paper roll holding sections are each replaceable, and a maximum outer winding diameter of a plurality of said paper rolls is changeable.

9. The medium issuing apparatus of claim 1, wherein a plurality of said paper roll holding sections are each replaceable, and the winding direction of a plurality of said paper rolls can be changed.

10. The medium issuing apparatus of claim 4, wherein said insertion guide members are paired and slidable independently of each other transversely of the paper rolls to permit the use of a plurality of paper rolls of different widths, with a reference surface being changeable as required.

11. The medium issuing apparatus of claim 10, wherein said insertion guide members are rendered slidable transversely of the paper rolls by a slide guide arranged on a back of each of said insertion guide members, with a slide slit being formed transversely on a mounting surface of said insertion guide members.

12. The medium issuing apparatus of claim 11, wherein at least one of a plurality of said paper roll drive mechanisms includes a mounting surface of said insertion guide members having a slide slit over a whole width thereof.

13. The medium issuing apparatus of claim 11, wherein said insertion guide members each include an arm and a lock protruding from the slide guide, and a hole for engaging said protruded lock corresponding to a size of the paper roll is formed in an area near the slide slit in the mounting surface of said insertion guide members.

14. The medium issuing apparatus of claim 1, wherein a transverse printing range of said common printing mechanism is changeable to handle a plurality of paper rolls having different widths.

15. The medium issuing apparatus of claim 1, wherein a portion of said second transport mechanism is opened/closed by an opening/closing mechanism, and said temporary storage space is formed when an inlet of said second transport mechanism is closed by said opening/closing mechanism, such that a plurality of cut papers are compressed into the bundle, said cut papers in said temporary storage space being ejected collectively when the inlet of said temporary storage space is opened by said opening/closing mechanism.

16. The medium issuing apparatus of claim 1, wherein a portion of said second transport mechanism is opened/closed by an opening/closing mechanism, and said temporary storage space is formed when an inlet of said second transport mechanism is closed, said second transport mechanism being operated when said inlet is opened.

17. The medium issuing apparatus of claim 16, wherein a forward end of said temporary storage space has a wedge-shaped section to couple forward ends of a plurality of cut papers to each other.

18. The medium issuing apparatus of claim 16, wherein a rear end of each of said cut papers is pushed down by a push-down mechanism to hold the cut papers when a plurality of said cut papers stored in said temporary storage section are issued.

19. The medium issuing apparatus of claim 16, wherein forward ends of a plurality of said cut papers are set in order by a stopper member formed at a sharp forward end of said temporary storage section.

20. The medium issuing apparatus of claim 19, wherein said stopper member is fixed in position when said temporary storage space is closed by said opening/closing mechanism, and said stopper member is rotatable about a pivot support when said temporary storage space is opened.

21. The medium issuing apparatus of claim 19, wherein a mounting position of said stopper member is changeable according to a size of a plurality of cut papers having a single length.

22. The medium issuing apparatus of claim 1, further comprising a single control circuit arranged on an upper surface of the apparatus, wherein two manual operating mechanisms having the same function are arranged on two sides of the common printing mechanism, respectively, such that a maintenance operating of the printing mechanism can be performed from the two sides.

23. The medium issuing apparatus of claim 1, further comprising a single control circuit, wherein a plurality of paper rolls can be arranged in tandem or juxtaposition, and a reference position for printing is controlled to be laterally convertible by said single control circuit.

24. The medium issuing apparatus of claim 1, further comprising a single control circuit arranged on an upper surface of the apparatus, wherein a transverse printing range of a plurality of the paper rolls is controlled to be changeable by said single control circuit.

25. The medium issuing apparatus of claim 1, further comprising a single control circuit arranged on an upper surface of the apparatus, wherein a reference position for printing onto a plurality of said paper rolls is controlled to be finely adjusted individually by said single control circuit.

26. The medium issuing apparatus of claim 1, wherein a paper roll holding section of each of a plurality of paper rolls arranged in juxtaposition can fall independently of each other when replacing a corresponding paper roll.

27. The medium issuing apparatus of claim 1, wherein said paper roll holding section can hold a plurality of paper rolls of different widths using a single roll support bar having a plurality of grooves engaging said paper roll holding section.

28. An automatic teller machine adapted to be operated by customers, including a control section connected on-line to a host computer, a customer operating section, a card operating section, a cash processing section, a deposit processing section, a medium issuing section and a host line processing section, wherein said medium issuing section is configured with a medium issuing apparatus comprising:

a paper roll holding section to hold a plurality of paper rolls;

a plurality of paper roll drive mechanisms to feed-out and rewind each of said paper rolls;

a plurality of paper roll drive mechanisms to feed-out and rewind each of said paper rolls;

a common printing mechanism to print onto roll paper fed out by each of said paper roll drive mechanisms;

a common cutting mechanism to cut each of said fed out papers into a predetermined length;

a first common transport mechanism to transport the paper cut by said common cutting mechanism;

a temporary storage section to store a plurality of cut papers transported by said first common transport mechanism and to compress the cut papers into a bundle;

a second common transport mechanism to transport the bundled papers stored in said temporary storage section;

a common ejection opening to eject the bundled papers transported by said second common transporting mechanism;

a common receiving section to receive bundled papers remaining at the common ejection opening; and a control section to control the operation of the apparatus as a whole.

29. The medium issuing apparatus of claim 28, wherein relative positions of the medium issuing apparatus and other input/output sections in the automatic teller machine are changeable.

30. The medium issuing apparatus of claim 28, wherein relative positions of a plurality of paper roll holding sections, replaceable as required, and other input/output sections in the automatic teller machine are changeable.

31. An automatic teller machine, comprising: a cash issuing unit; and a medium issuing unit, wherein said medium issuing section includes:

a paper roll holding unit to hold a plurality of paper rolls;

a printing unit to print onto roll paper fed out of the paper rolls;

a cutting unit to cut each of said fed out papers into a predetermined length;

a bundling unit to compress the cut papers into a bundle;

an ejection unit to eject the bundled papers; and a receiving unit to receive uncollected bundled papers remaining at the common ejection opening.

32. The automatic teller machine of claim 31, wherein the paper roll holding section is adjustable to allow multiple width paper rolls.

33. The automatic teller machine of claim 31, wherein the printing unit is capable of printing receipt information on one roll paper and supplementary information on a second roll paper.

* * * * *

UNITED STATES PATENT AND TRADEMARK OFFICE

CERTIFICATE OF CORRECTION

PATENT NO. : 6,386,445 B1

DATED : May 14, 2002

INVENTOR(S) : Masayuki Imai et al.

It is certified that error appears in the above-identified patent and that said Letters Patent is hereby corrected as shown below:

Column 20,

Line 40, change "operating" to -- operation --.

Signed and Sealed this

Sixteenth Day of July, 2002

*Attest:*

JAMES E. ROGAN

*Attesting Officer*

*Director of the United States Patent and Trademark Office*